US007009611B2

(12) United States Patent
Di Lelle

(10) Patent No.: US 7,009,611 B2
(45) Date of Patent: Mar. 7, 2006

(54) GENERATING THREE DIMENSIONAL TEXT

(75) Inventor: Juan Pablo Di Lelle, Montreal (CA)

(73) Assignee: Autodesk Canada Co., Montreal (CA)

( * ) Notice: Subject to any disclaimer, the term of this patent is extended or adjusted under 35 U.S.C. 154(b) by 176 days.

(21) Appl. No.: 09/996,186

(22) Filed: Nov. 28, 2001

(65) Prior Publication Data
US 2002/0154122 A1  Oct. 24, 2002

(30) Foreign Application Priority Data
Apr. 19, 2001  (GB)  .................................. 0109626

(51) Int. Cl.
G06T 11/00 (2006.01)
G06T 17/00 (2006.01)
G09G 5/00 (2006.01)

(52) U.S. Cl. ...................... 345/467; 345/420; 715/780
(58) Field of Classification Search ................ 345/467, 345/468, 469, 419, 420, 423, 653, 664, 648; 715/780, 801, 815, 713, 793, 783
See application file for complete search history.

(56) References Cited

U.S. PATENT DOCUMENTS

| 4,821,214 | A | * | 4/1989 | Sederberg ................... 345/420 |
| 4,873,651 | A | | 10/1989 | Raviv |
| 5,010,502 | A | * | 4/1991 | Diebel et al. ............... 345/419 |
| 5,539,868 | A | * | 7/1996 | Hosoya et al. .............. 345/471 |
| 5,555,353 | A | * | 9/1996 | Shibazaki ................... 345/426 |
| 5,680,525 | A | * | 10/1997 | Sakai et al. ................. 345/585 |
| 5,682,468 | A | * | 10/1997 | Fortenbery et al. ......... 345/419 |
| 5,805,783 | A | * | 9/1998 | Ellson et al. ............... 345/468 |
| 5,910,804 | A | * | 6/1999 | Fortenbery et al. ......... 345/419 |
| 6,134,338 | A | * | 10/2000 | Solberg et al. ............. 382/113 |
| 6,188,408 | B1 | * | 2/2001 | Suzuoki ...................... 345/423 |
| 6,246,805 | B1 | * | 6/2001 | Sanjeev et al. ............. 382/285 |
| 6,404,435 | B1 | * | 6/2002 | Miller et al. ................ 345/468 |
| 6,483,508 | B1 | * | 11/2002 | Ishikawa ..................... 345/420 |
| 6,512,522 | B1 | * | 1/2003 | Miller et al. ................ 345/474 |
| 6,583,786 | B1 | * | 6/2003 | Baumann .................... 345/419 |
| 2001/0026272 | A1 | * | 10/2001 | Feld et al. .................. 345/419 |
| 2002/0105515 | A1 | * | 8/2002 | Mochizuki .................. 345/419 |
| 2002/0149622 | A1 | * | 10/2002 | Uesaki et al. ............... 345/764 |
| 2002/0196257 | A1 | * | 12/2002 | Paolini et al. .............. 345/467 |

FOREIGN PATENT DOCUMENTS

| GB | 2332348 A | | 6/1999 |
| JP | 63-131270 | * | 6/1988 |

* cited by examiner

Primary Examiner—Ryan Yang
(74) Attorney, Agent, or Firm—Gates & Cooper LLP

(57) ABSTRACT

A method and apparatus are provided for generating three-dimensional text 1403 within images 1601 composited in real time, by means of generating three-dimensional text 1403 from one or a plurality of text formatting templates 303. Storage means 204 stores said text formatting templates 303 and instructions 302 for processing means 201, 202. Said instructions 302 configure said processing means 201, 202 to define (404) a text formatting template 512. Said instructions 302 further configure said processing means 201, 202 to equip (405) said defined text formatting template 512 with three-dimensional preferences with which to format text 1402 to be included in said template and subsequently equip (407) said defined text formatting template 512 with said text 1402. Said instructions 302 finally configure said processing means 201,202 to render (408) said two-dimensional template 512 including said text 1403 formatted according to said three-dimensional preferences (1602).

21 Claims, 20 Drawing Sheets

GENERATING THREE DIMENSIONAL TEXT

BACKGROUND OF THE INVENTION

1. Field of the Invention

The present invention relates to generating three-dimensional text within images composited in real time.

2. Description of the Related Art

Systems are known with which to generate three-dimensional text characters. According to the prior art, said text characters can be represented as a three-dimensional geometric model including polygons constructed from vertices defined by three-dimensional co-ordinates. Alternatively, any of said text character may be used to derive a set of curves defining the outline of said character. This set of curves is transformed into a set of polygons and said set of polygons may be created by converting said curves into sets of connected line segments and then tessellating the polygon defined by said line segments.

Regardless of the method employed to confer image depth to said text characters, as well as of the various three-dimensional spatial transformations, lighting effects and other colourisations which are also well known to those skilled in the art, these text character graphic objects are traditionally transferred to a graphics processor to be manipulated by an animator or editor in order to produce an image that can be further processed, ie integrated into a film or video broadcast.

Therefore, it can be said that three-dimensional characters generated according to the prior art require an editor to be aware of the contents of the image and/or broadcasts within which said three-dimensional text will be implemented, in order to accurately define, transform and render said three-dimensional text. According to said prior art, the contents of said graphical titles always have to be known in advance of the filming of the video sequence, as every successive instantiation of said titles, corresponding to successively changing text contents, has to be designed and rendered in order to ensure that it conforms to position and size imperatives when overlayed onto each frame of the broadcast, thereby precluding live broadcast from benefiting from said three-dimensional text titling effects.

The present invention overcomes this problem by providing a two-dimensional template defined within a three-dimensional space which formats text according to three-dimensional properties such that said text can be rendered as three-dimensional text in real-time.

BRIEF SUMMARY OF THE INVENTION

According to a first aspect of the present invention, there is provided an apparatus for generating three-dimensional text within images composited in real time, comprising means for generating said three-dimensional text from one or a plurality of text formatting templates, including processing means and storage means. Said storage means stores said text formatting templates and instructions for said processing means. Said instructions configure said processing means to perform the steps of defining one of said text formatting templates as a two-dimensional template equipped with Cartesian co-ordinates within a three-dimensional space; equipping said defined text formatting template with three-dimensional preferences with which to format text to be included in said template; equipping said defined text formatting template with said text and rendering said two-dimensional template including said text formatted according to said three-dimensional preferences within said three-dimensional space.

According to a second aspect of the present invention, there is provided a method for generating three-dimensional text within images composited in real time, by means of generating said three-dimensional text from one or a plurality of text formatting templates. Storage means stores said text formatting templates and instructions for processing means. Said instructions configures said processing means to perform the steps of defining one of said text formatting templates as a two-dimensional template equipped with Cartesian co-ordinates within a three-dimensional space; equipping said defined text formatting template with three-dimensional preferences with which to format text to be included in said template; equipping said defined text formatting template with said text and rendering said two-dimensional template including said text formatted according to said three-dimensional preferences within said three-dimensional space.

BEST MODE FOR CARRYING OUT THE INVENTION

Figure 1:
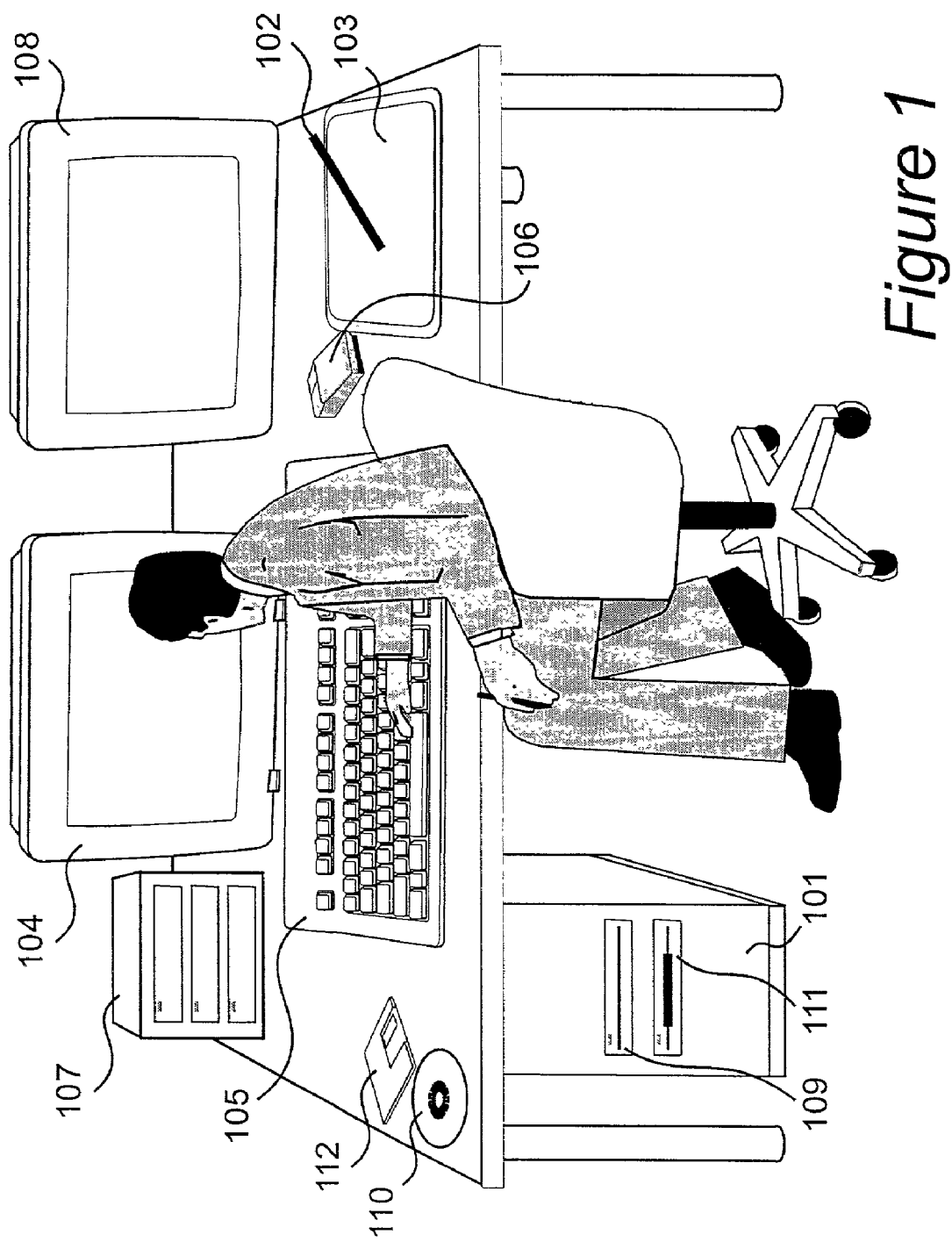
FIG. 1 shows a computer editing system, including a computer system video display unit and a broadcast-quality monitor.

A computer editing system, including a computer system video display unit and a broadcast-quality monitor, is shown in FIG. 1.

FIG. 1

In the system shown in FIG. 1, instructions are executed upon an IBM Compatible Personal Computer or an Apple Macintosh. However, depending upon the level of processing required and the size of images being considered, large graphics-based processing system may be used, such as an ONYX II manufactured by Silicon Graphics Inc.

The processing system 101 receives instructions from an operator by means of a stylus 102 supplied to a touch tablet 103, in response to visual information received by means of a visual display unit 104. In addition, data may be supplied by the operator via a keyboard 105 or a mouse 106, with input source material being received via a real-time digital video recorder or similar equipment configured to supply high bandwidth frame data.

The processing system 101 includes internal volatile memory in addition to bulk randomly accessible storage, which is provided by means of a RAID disk array 107. Output material may also be viewed by means of a high quality broadcast monitor 108. System 101 includes a CD ROM reader 109 to allow executable instructions to be read from an instruction carrying medium in the form of a CD ROM 110. In this way, executable instructions are installed on the computer system for subsequent execution by the system. System 101 also includes an external medium reader 111 to allow object properties and data to be written to an instruction or data carrying medium in the form of a floppy disk 112.

Figure 2:
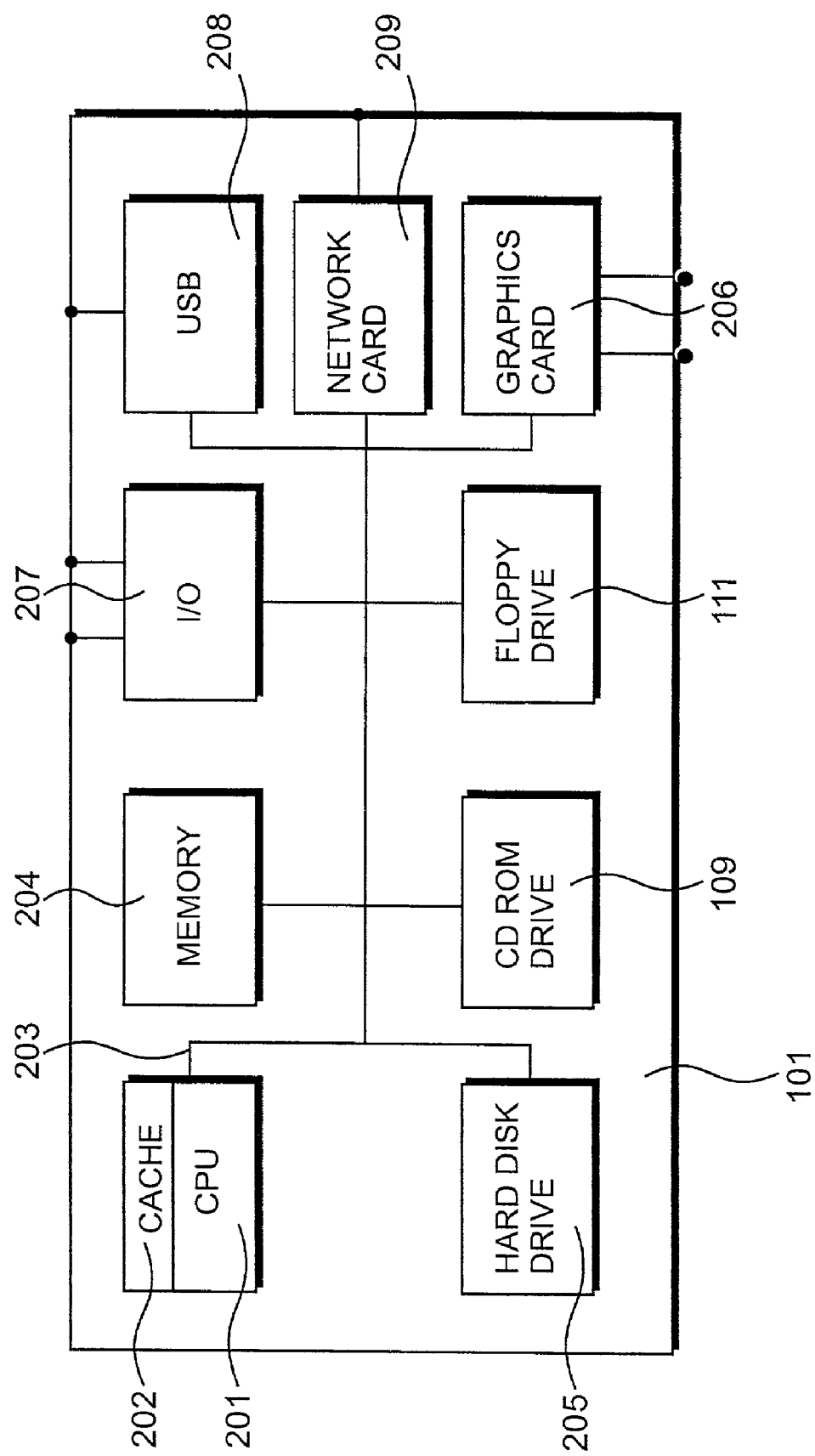
FIG. 2 details the typical hardware components of the computer editing system shown in FIG. 1.

The internal architecture for the processing system 101 is shown in FIG. 2.

FIG. 2

The system includes a central processing unit 201 which fetches and executes instructions and manipulates data. Frequently accessed instructions and data are stored in a high-speed cache memory 202. Said central processing unit 201 is connected to a system bus 203. System bus 203 provides connectivity with a larger main memory 204, which requires significantly more time for the CPU to access than the cache 202. The main memory 204 contains between one hundred and twenty-eight and two hundred and fifty-six megabytes of dynamic random access memory. A hard disk drive (HDD) 205 provides non-volatile bulk storage of instructions and data. A graphics card 206 receives graphics data from the CPU 201, along with graphics instructions and supplies graphical data to visual display unit 104 and broadcast-quality monitor 108. The I/O device 207 or universal serial bus 208 receive input commands from stylus 102 and tablet 103, keyboard 105 and mouse 106. The external medium drive 111 is primarily provided for the writing of data, such as sets of ASCII characters corresponding to data generated by means of stylus 102, tablet 103, keyboard 105 and mouse 106 to floppy 112, and CD-ROM drive 109 is provided for the loading of executable instructions stored on CD-ROM 110 to the hard disk drive 205. A network card 209 provides connectivity to the RAID array 107.

Figure 3:
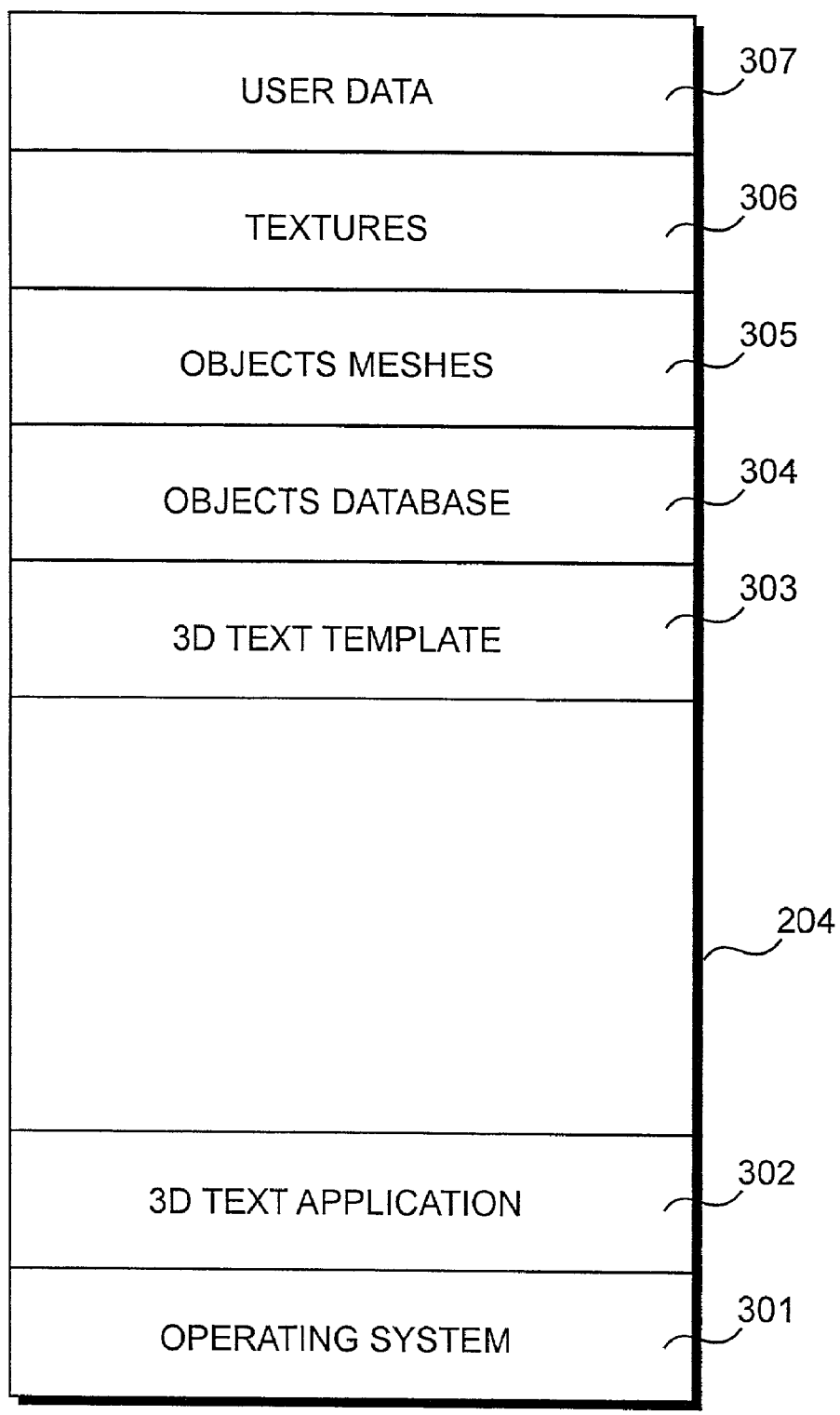
FIG. 3 illustrates the contents of the main memory shown in FIG. 2.

A summary of the contents of the main memory 204 of the system 101 is shown in FIG. 3, as subsequently to the loading of instructions according to the present invention.

FIG. 3

Main memory 204 includes primarily an operating system 301, which is preferably Microsoft Windows 2000 or LINUX as said operating systems are considered by as those skilled in the art to be particularly stable when using computationally intensive applications. Main memory 204 also includes a 3-D text application 302, which provides the operator of system 101 with means with which to visualise ASCII characters inputted by means of keyboard 105 and display said ASCII input onto visual display unit 104.

Main memory 204 includes one or a plurality of 3-D text templates 303 according to the invention, an object database 304, object meshes 305 and object textures 306. Main memory 204 finally includes user data 307.

Figure 4:
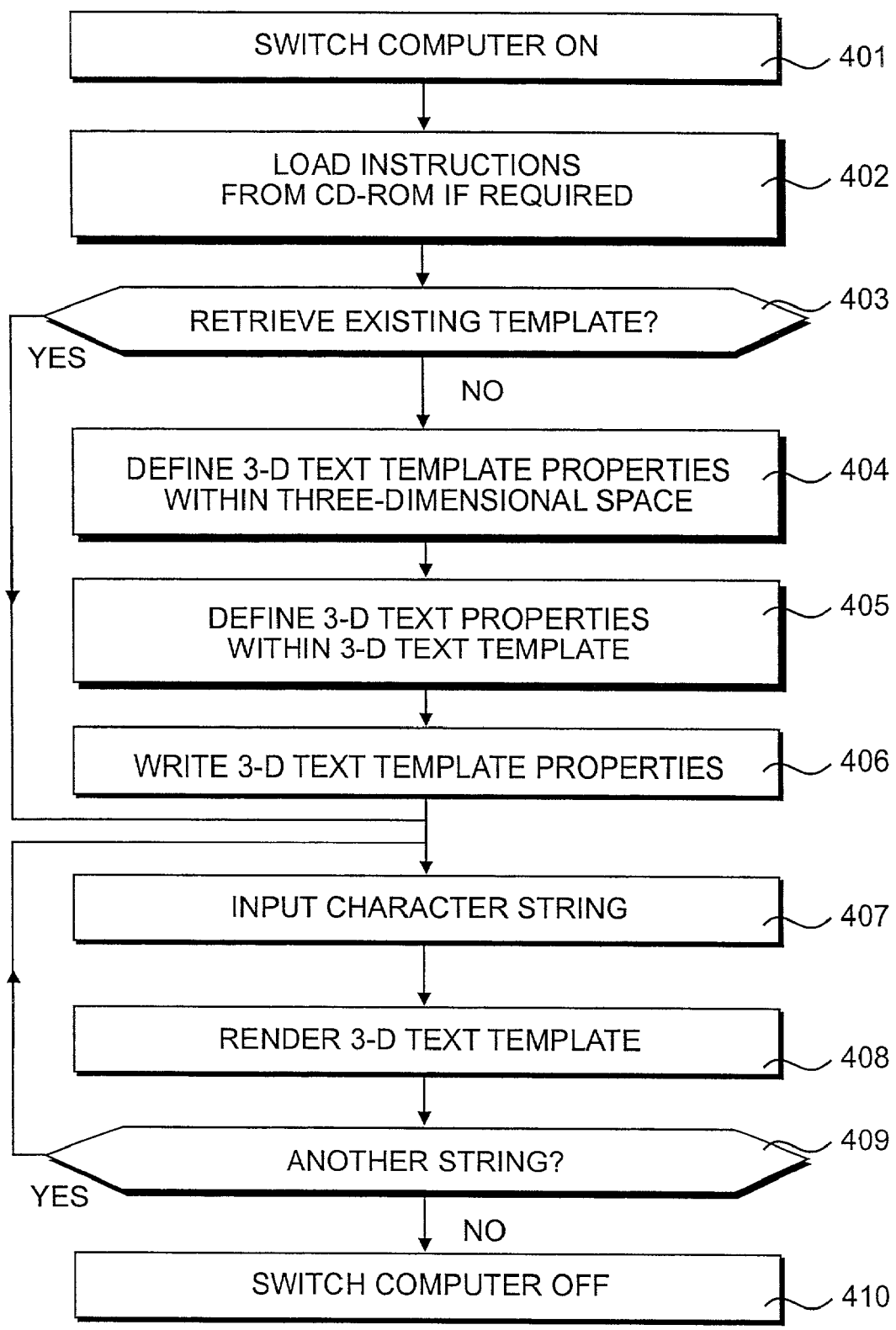
FIG. 4 details the actions performed at the computer editing system by the 3-D text application shown in FIG. 3, according to the invention.

The successive operations required to generate three-dimensional text according to the invention are detailed in FIG. 4.

FIG. 4

At step 402, the system 101 is switched on. The instructions corresponding to the 3-D text application 302 are subsequently loaded at step 402 from CD ROM 110.

At step 403, a question is asked as to whether an existing 3-D template should be retrieved for compositing purposes. If the question of step 403 is answered positively, the 3-D text application 302 loads the 3-D text template 303 from the hard disk drive 205 or the floppy disk 112 in conjunction with objects database 304, wherein said template 303 is referenced, and control is directed to step 407. Alternatively, if the question of step 403 is answered negatively, then at step 404 a default 3-D text template 303 is defined and equipped with properties within a three-dimensional space. At step 405, the text which will be equipping said 3-D text template 303 is defined and equipped with properties within said template. Upon completing the successive defining operations at step 404 and 405, the resulting final properties are eventually written as a 3-D text template 303 referenced within objects database 304 and likely to be retrieved according to step 403 at a later session of application 302.

At step 407, a string of characters is inputted by means of keyboard 105 into the objects database 304 and is subsequently rendered at step 408 according to the definitions and properties of steps 404 to 406.

A question is asked at step 409 as to whether the string of character inputted at step 407 requires amending, for instance if the broadcast requires multiple titles rendered identically or, if the string of characters inputted at step 407 contained a spelling or grammatical error. If the question of step 409 is answered positively, then control is returned to step 407, wherein a new string of characters can be inputted or the existing character string can be edited. Alternatively, if the question asked at step 409 is answered in the negative, the system 101 is eventually switched off at step 410.

Figure 5:
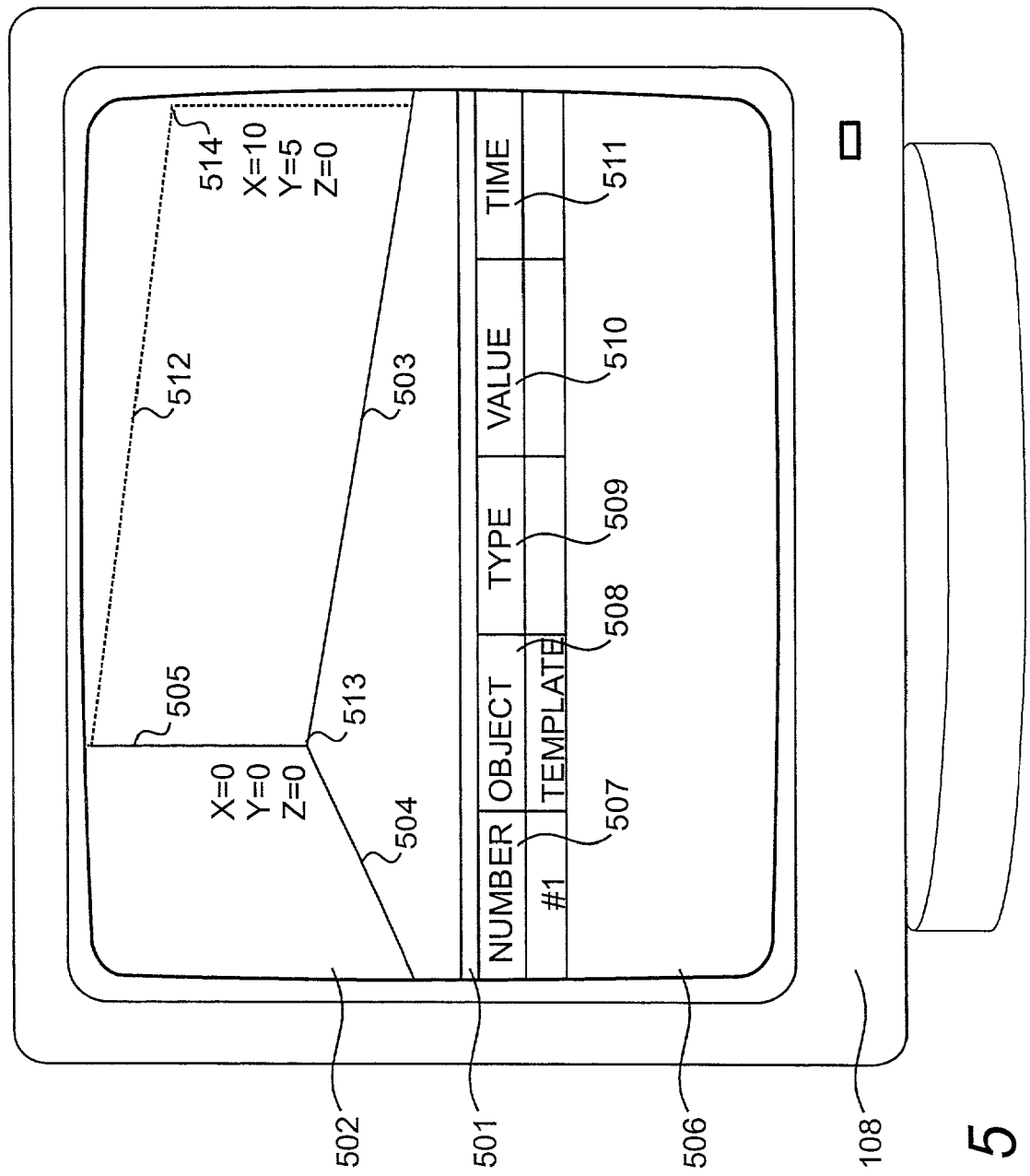
FIG. 5 shows the graphical user interface of the 3-D text application shown in FIGS. 3 and 4, including a visualisation window.

An example of the graphical user interface (GUI) of the 3-D text application 302 displayed on the output monitor 104 is shown in FIG. 5.

FIG. 5

The GUI 501 divides the display area of output monitor 104 into multiple windows. A first of said windows is a visualisation window 502, within which the respective results of operations performed according to steps 403 to 408 are previewed at various levels of rendering quality. Said various levels range from wireframe quality, i.e. vectored lines, to fully-rendered quality, i.e. said vectored lines onto which textures, lighting and a plurality of visual editing effects which will be further detailed in the present embodiment are implemented. In the example, a three-dimensional space is visualised with reference to a width abscissa 503, a depth abscissa 504 and a height ordinate 505.

A second window 506 displays the contents of the page of the objects database 304 relating to the specific template 303 being edited. Said page includes an object number referencing column 507, an object referencing column 508, an object type column 509, an object value column 510 and a timecode display column 511. Depending upon the object selected, not every object requires a type and/or value.

According to the invention, each entry in each of said columns may be selected for editing by means of stylus 102 and tablet 103, keyboard 105, or mouse 106 or a combination thereof, and new windows may be generated for said editing purpose within the GUI 501 depending upon the type of object selected, as will be detailed and shown further in the present embodiment.

In the example, a new 3-D text template requires creating and 3-D text application 302 thus generates a new page in the object database 304 with a default 3-D text template 303. Said default template is rendered within window 502 as a two-dimensional template object 512, the Cartesian co-ordinates of two opposite corners 513 and 514 of which are overlayed in said window 502. Corner 513 is located at the origin of the three-dimensional space and thus its Cartesian co-ordinates are (0, 0, 0). Conversely, corner 514 is diagonally opposite to corner 513 and is thus equipped with width and height co-ordinates and, in the example, said Cartesian co-ordinates are (10, 5,0).

Figure 6:
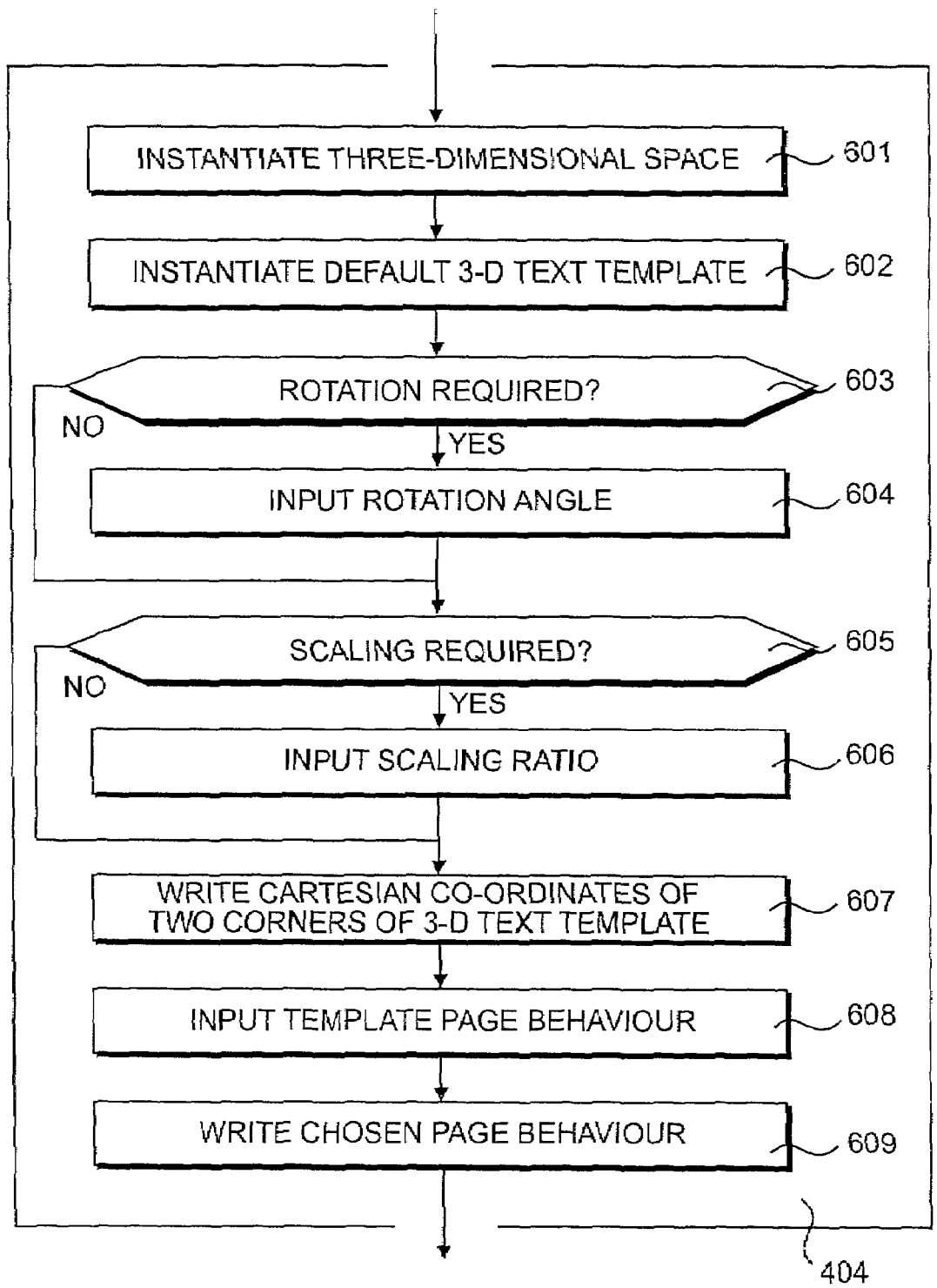
FIG. 6 details the actions performed at the computer editing system shown in FIG. 1 in order to define the 3-D template properties shown in FIG. 4.

The various steps required in order to define a two-dimensional template and equip said template with properties within the three-dimensional space shown in window 502 at step 403 are further detailed in FIG. 6.

FIG. 6

At step 601, the 3-D text application 302 instantiates a three-dimensional space equipped with an origin, a width 503, a height 505 and a depth 505, such that any object placed within said three-dimensional space can be accurately located by means of (x, y, z) Cartesian co-ordinates.

At step 602, 3-D text template 303 is instantiated as a two-dimensional template object 512 within said three-dimensional space. That is, said template is a surface delimited by a width and a length but it is not equipped with any depth yet. At step 603, a question is asked as to whether the template instantiated at step 602 must be rotated in order to be satisfactorily positioned within the three-dimensional space. If the question asked at step 603 is answered negatively, control is directed to step 605. Alternatively, if the question asked at step 603 is answered positively, then at step 604 a rotation angle is inputted as an angular value or the template object 512 itself is rotated within the three-dimensional space by means of mouse 106 or a combination of stylus 102 and table 103. The rotating operation carried out at step 604 can be carried out within a two-dimensional plane and thus the template rotates within the same plane as is defined by its surface, or said rotation may be free-form within the three-dimensional space and, at this stage, confers a depth property to the template.

At step 605 a question is asked as to whether the template object requires scaling, i.e. the standard surface of said template object 512 when it is instantiated at step 602 must be increased or decreased. If the question asked at step 605 is answered negatively, control is directed to step 607. Alternatively, if the question asked at step 605 is answered positively, at step 606 a scaling percentage is input by means of keyboard 105, or the template object 512 is scaled by means of mouse 106 or a combination of stylus 102 and tablet 103.

At step 607, the final (x, y, z) Cartesian co-ordinates of two opposite corners 513, 514 of the template object 512 are written in the 3-D text template 303 properties. At step 608, the template behaviour pattern is chosen amongst three specific modes.

The fixed mode locks the Cartesian values written at step 607 and, upon equipping the 3-D text template with text, said fixed mode also locks all attributes of said text such that it places a limit on the length of the character string displayable by said template.

Alternatively, the wrap mode only locks the width of the template as the only constraint, such that a string of characters inputted in said template beyond the total width of said template will be rendered on a new lower line below the first line of said character string, akin to a carriage return taking place.

Finally, the stretch mode selectable at step 608 confers dynamism to the 3-D text template, characterised in that the surface of said 3-D text template increases in direct proportion to the content, i.e. the length, of the string of characters. The Cartesian values written at step 607 are uniformly increased such that corners 513, 514 extend away from one another and thus increase the surface they define.

Figure 7A:
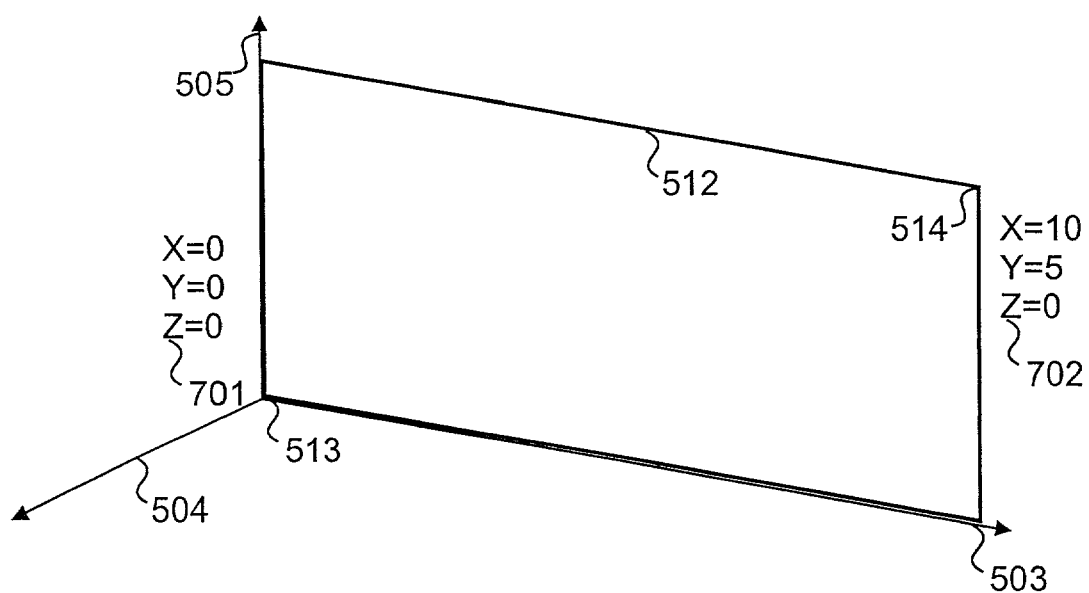
FIG. 7A shows a two-dimensional 3-D text template instantiated within a 3-D space within a visualisation window shown in FIG. 5.

Upon inputting the template behaviour at step 608, the chosen page mode is written in the 3-D text template properties at step 609. The template object 512 instantiated at step 602 within a three-dimensional space instantiated at step 601 in the visualisation window 502 is shown in greater detail in FIG. 7A.

FIG. 7A

In order to accurately locate and position the template object 512 within the three-dimensional space, the 3-D text application 302 references two opposite corners 513 and 514 of the surface delimited by template. As it is known that corners 513 and 514 each represent the intersection at a right angle of two strictly perpendicular lines and that at least one line of one of said sets is known to be strictly parallel to another line in the opposite set, the 3-D text application 302 automatically computes the remaining two corners of template object 512. The benefit of referencing template object 512 by means of two corners as opposed to four is to minimise the amount of data required in order to define template object 512 within the 3-D space.

As the volume instantiated at step 601 is three-dimensional, the two corners 513, 514 of template object 512 are thus equipped with respective Cartesian co-ordinates 701, 702 that allows the 3-D text application 302 to accurately position said points in relation to the width 503, depth 504 and height 505 of said three-dimensional space. As the template object 512 is initially instantiated as a two-dimensional object, said points 513 and 514 are only equipped with length and height co-ordinates and their respective depth co-ordinate is null. In the example, as it was previously explained, the Cartesian co-ordinates 701 of corner 513 are (0,0,0) and the cartesian co-ordinates 702 of corner 513 are (10,5,0), with said co-ordinates values given sequentially as width, height and depth.

Figure 7B:
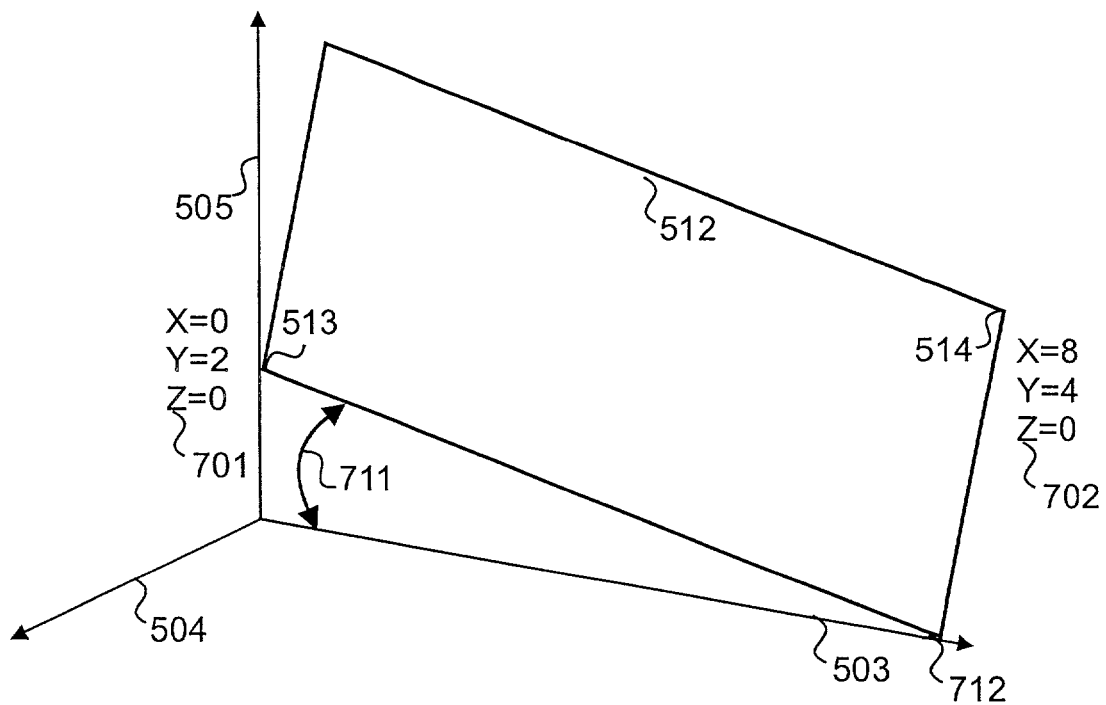
FIG. 7B shows the two-dimensional 3-D text template shown in FIG. 7A rotated in two dimensions within said 3-D space.

The template object 512, after being instantiated at step 602, can subsequently be rotated at step 604 either within a two-dimensional plane or within the three-dimensional space. Said template object 512 is shown in FIG. 7B equipped with a rotation within two-dimensions only.

FIG. 7B

In the example, the template object 512 is rotated by an angle 711 within the plane delimited by the width abscissa 503 and the height coordinate 505. The respective Cartesian co-ordinates 701, 702 of corners 513 and 514 therefore still do not include a depth value. However, even if said respective Cartesian values 701, 702 of said corners 513 and 514 included a depth value, if said depth value is strictly identical in both sets of co-ordinates, said depth value translates the fact that the surface defined by said two corners 513, 514 is strictly parallel to the width abscissa 503 and the height ordinate 505, and strictly perpendicular to the depth abscissa 504 and thus, template object 512 is still positioned within a two-dimensional plane within the three-dimensional space. In the example, the two-dimensional rotation is carried out as the lower right-hand corner 712 of template object 512 is chosen as the centre of rotation, or origin of the angle 711. Said centre of rotation can be arbitrarily positioned within the three-dimensional space and will be easily implemented by those skilled in the art. After template object 512 is rotated by angle 711, the Cartesian co-ordinates 701, 702 of corners 513, 514 are respectively (0,2,0) and (8,4,0).

Figure 7C:
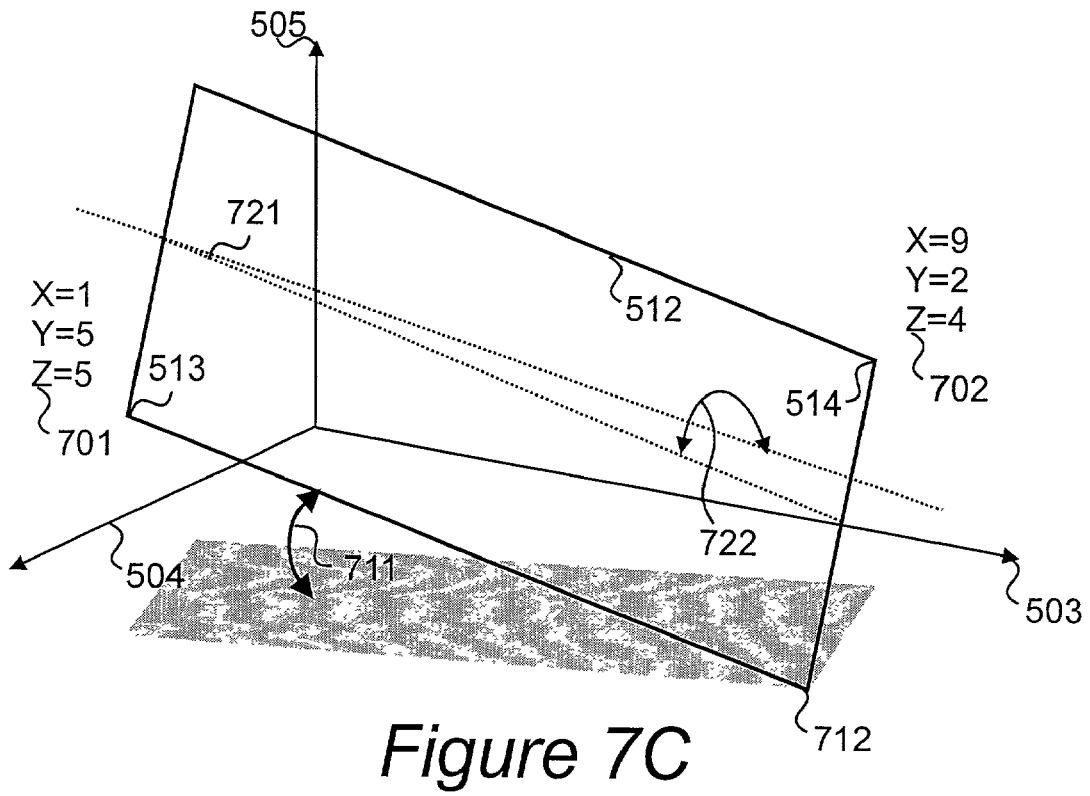
FIG. 7C shows the two-dimensional 3-D text template shown in FIG. 7A rotated in three dimensions within said 3-D space.

Alternatively, the 3-D text templates 512 is shown in FIG. 7C rotated within the three-dimensional space.

FIG. 7C

In addition to the rotation within a two-dimensional plane, corners 513 and 514 are respectively given differing depth value. In effect, template object 512 rotates relative to corner 712 as the point of origin of the rotation angle 711 and also rotates relative to the median axis 721 of the two-dimensional surface delimited by template object 512 according to the rotation angle 722. Consequently, the respective Cartesian co-ordinates 701, 702 of corner 513 and corner 514 now vary to a fairly large extent. In the example, after the template object 512 is rotated by angles 711 and 722, corner 513 has Cartesian co-ordinate values 701 of (1, 5, 5) and corner 514 has Cartesian co-ordinate values 702 of (9, 2, 4).

Figure 7D:
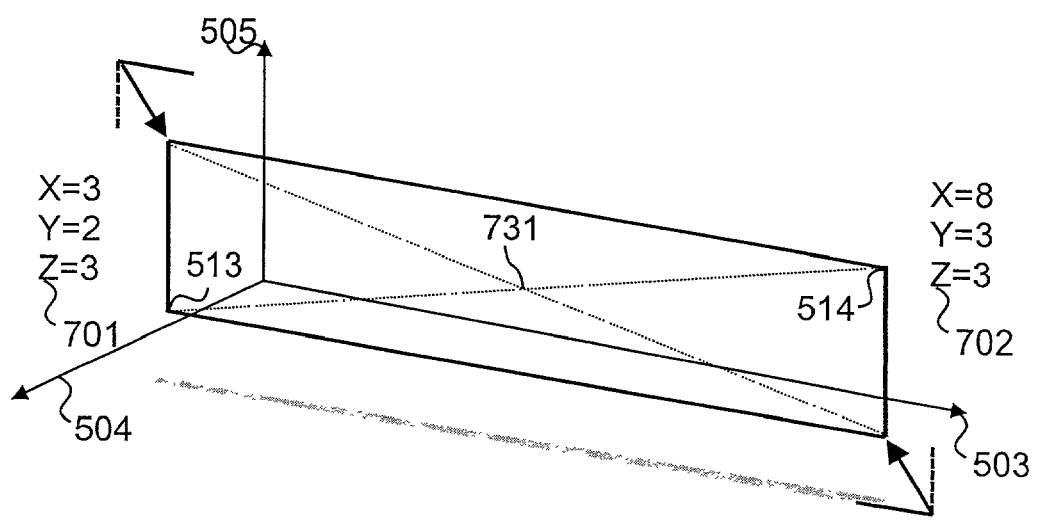
FIG. 7D shows the two-dimensional 3-D text template shown in FIG. 7B scaled within said 3-D space.

Two-dimensional and three-dimensional rotation of objects, whether said objects are themselves two-dimensional or three-dimensional, should be easily implemented by those skilled in the art. According to the invention, template object 512 can be further defined according to step 606, wherein it can be scaled, ie the total surface delimited by the four corners of template object 512 can be increased or decreased. The template object 512 is shown in FIG. 7D scaled within the 3-D space instantiated at step 512.

FIG. 7D

In the example, the template does not require two-dimensional or three-dimensional rotation but the operator or system 101 is aware that further three-dimensional objects will require implementing within the three-dimensional space and thus template object 512 requires additional depth. The "depth" Cartesian value of corners 513 and 514 is therefore implemented in such a way that it is identical for each respective corner. In the example, the default respective Cartesian values 701, 702 of corner 513 and corner 514 were (0, 0, 0) and (10, 5, 0) thus a depth value of '3' is added, such that said respective Cartesian values 701, 702 of corner 513 and corner 514 are now (0, 0, 3) and (10,5,3).

According to the present invention, it is also known to the user of system 101 that the standard surface of template object 512, upon its instantiation, is too large and must be decreased. Consequently, said user inputs a scaling percentage or clicks with mouse 106 or stylus 102 and table 103 on said template object 512, or a corner thereof and subsequently reduces the total surface of template object 512 in such a way that each corner of template object 512 is brought closer to the imaginary centre 731 of the surface delimited by template object 512 by an identical ratio, known to those skilled in the art as the aspect ratio. Inversely, if the total surface of template object 512, upon its instantiation, was too small then the scaling operation would inverse the previous mechanism and the four corners of said template object 512 would extend away from said imaginary centre 731 of the surface delimited by template object 512 by an identical ratio also known to those skilled in the art as said aspect ratio. In the example, as template object 512 is scaled, the respective Cartesian co-ordinates 701, 702 of corners 513 and 514 are amended by means of the aspect ratio to (3,2,3) and (8,3,3).

Figure 8:
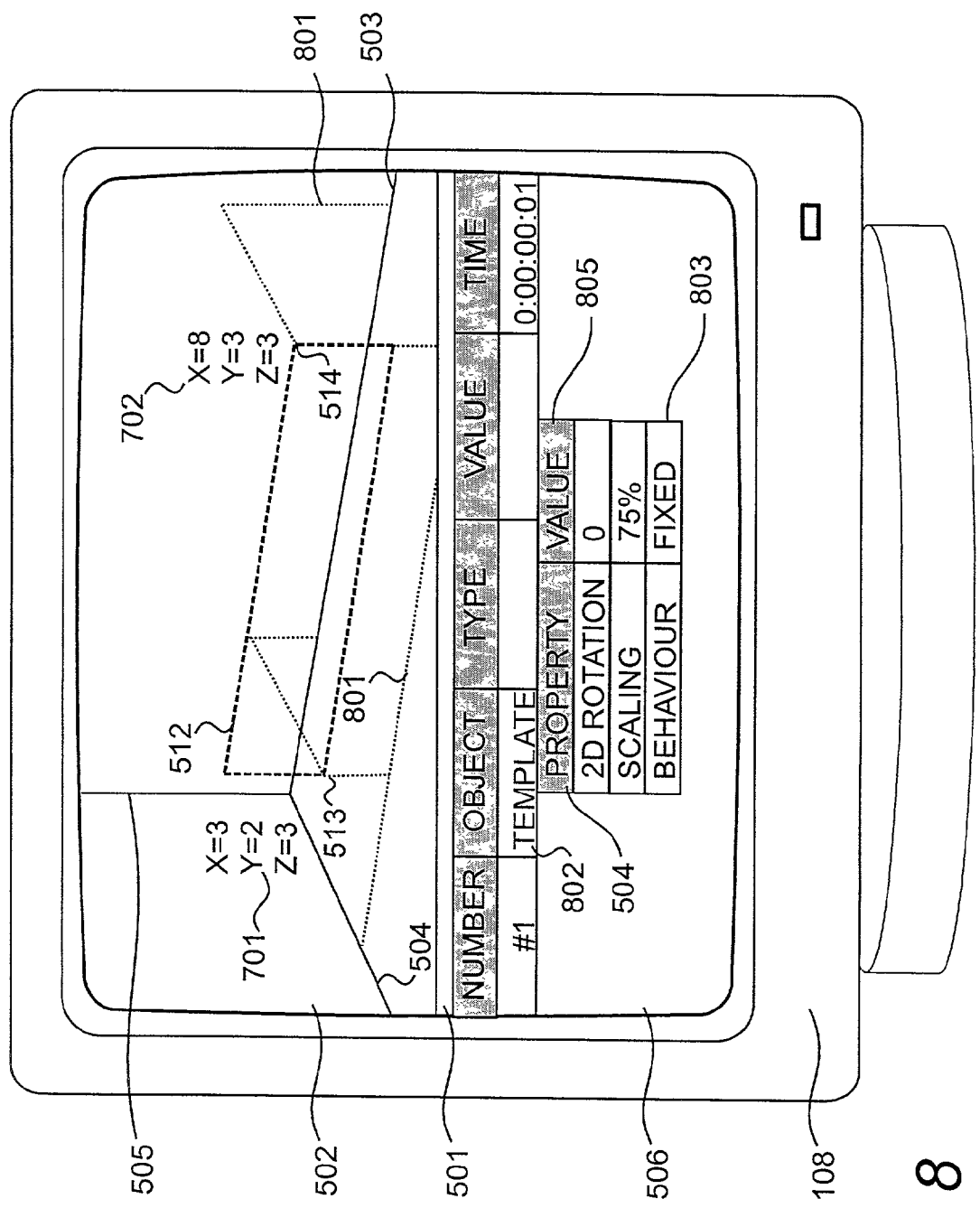
FIG. 8 shows the graphical user interface of FIG. 5 including a two-dimensional 3-D text template as detailed in FIGS. 7A to 7D.

An example of the graphical user interface (GUI) of the 3-D text application 302 displayed on the output monitor 104 subsequently to the operations performed according to steps 601 to 609 and further detailed in FIGS. 7A to 7D is shown in FIG. 8.

FIG. 8

The results of operations performed according to steps 601 to 609 are previewed at wireframe quality, i.e. vectored lines, within the visualisation window 502. Dotted lines 801 link the corners 513, 514 to the width abscissa 503, the depth abscissa 504 and the height ordinate 505 within the three-dimensional space so as to visualise the respective positions of said corners relative to said abscissas and ordinate, in addition to the overlayed Cartesian co-ordinates 701, 702. Said rotating and scaling operations according to steps 603 to 606 can be performed either by means of clicking with mouse 106 or a combination of stylus 102 with tablet 103 onto template object 512 within window 502 and accomplishing said operations by means of motions applied to said input means or, alternatively, clicking with mouse 106 or a combination of stylus 102 with tablet 103 onto the 'template' entry 802 in object referencing column 508 within window 506.

Upon clicking on said 'template' entry 802, a third window 803, also known to those skilled in the art as a 'drop-down' menu, displays the properties of the template object 512 within the three-dimensional space, which are stored in the main memory 204 as part of the 3-D text template 303 being edited. Said properties include a template properties referencing column 804 and a template property value column 805. Said properties refer to rotating, scaling and page behaviour operations according to steps 603 through to 609. According to the invention, each entry in said property value column 804 may be selected for editing by means of stylus 102 and tablet 103, keyboard 105, or mouse 106 or a combination thereof.

In the example, the 3-D text template object 303 is defined and its properties are amended as was previously explained in FIG. 7D. Accordingly, the value of the two-dimensional rotation property is null, as no rotation is required at all for the purpose intended. The value of the scaling property is 'seventy-five percent', indicating that the default surface of the template object 512 was uniformly reduced by 25%. The page behaviour mode selected according to step 608 is 'fixed' mode, as the text to be inputted in template object 303 must appear strictly identical at all times for the purpose intended, and thus the value of the behaviour property is 'fixed'.

Figure 9:
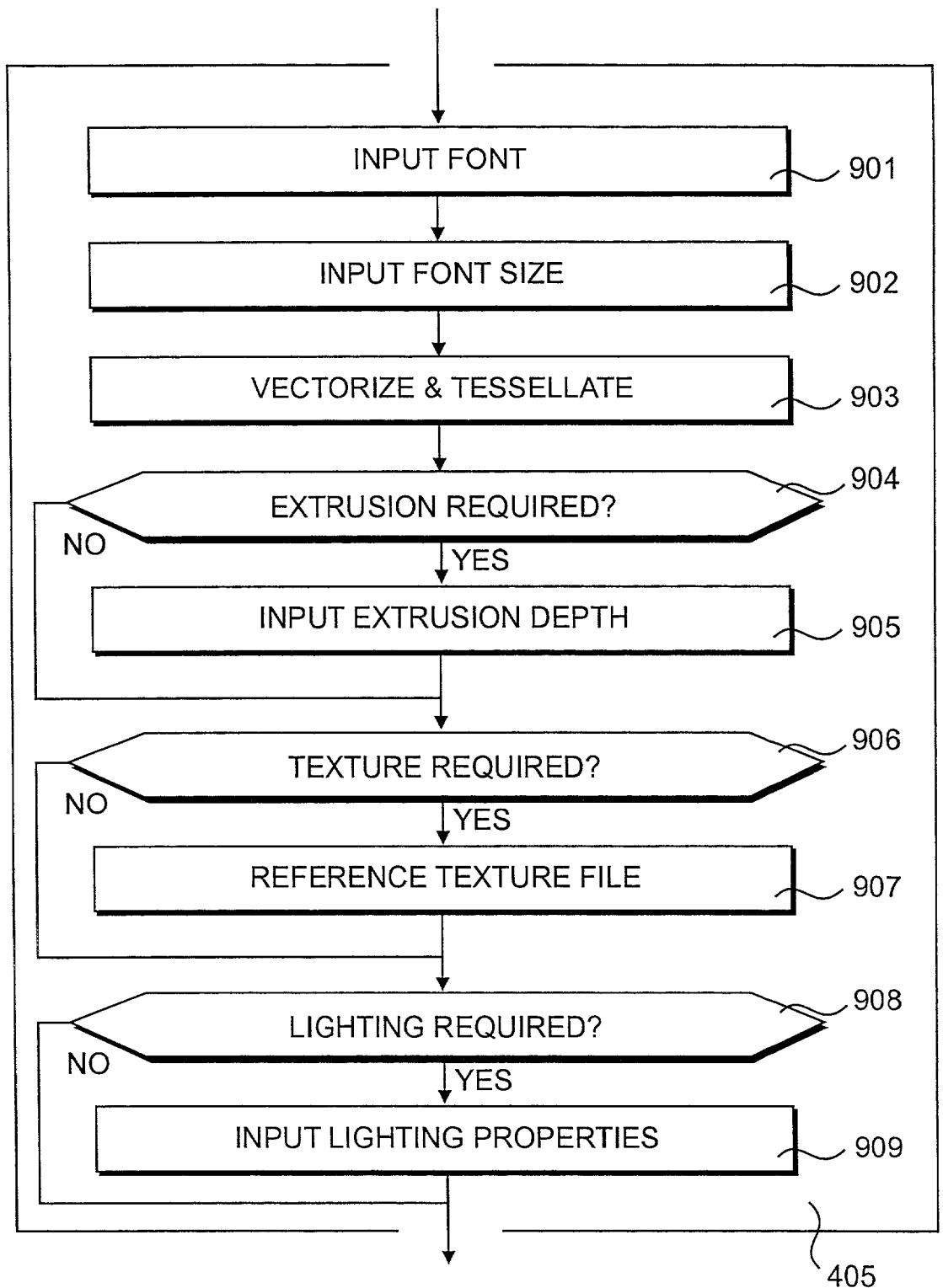
FIG. 9 details the actions performed by the 3-D text applications shown in FIGS. 3 and 4 in order to define the 3-D text properties in the 3-D text template.

Referring back to FIG. 6, the 3-D text template 303 is now fully defined by means of its properties and the final Cartesian co-ordinates 701, 702 within the three-dimensional space. Further to the definition of the 3-D text template, the text which will be contained within said template must now also be defined with properties according to step 405. The corresponding actions performed by the 3-D text applications 302 in order to define the 3-D text properties in the 3-D text template are detailed in FIG. 9.

FIG. 9

At step 901, a font is chosen with which to format the text which will be inputted in the 3-D text template as a string of ASCII characters. Said font identifies a specific shape with which to format the standard ASCII characters and is well known to those skilled in the art. Many different types of fonts exists, one of which is particularly well known to those skilled in the art as "True Type Font". Upon choosing an appropriate font at step 901, a font size is indicated at step 902. Said font size defines the size with which to render every inputted ASCII character according to the font chosen at step 901, and is traditionally expressed as the number of dots, or pixels, with which to model said ASCII character. Formatting operations performed according to steps 901 and 902 are typical text formatting operations carried out within a two-dimensional plane, such as within a word processor.

Figure 10A:
FIG. 10A shows a string of text characters equipped with a font and a font size.

A string of ASCII characters is shown in FIG. 10A equipped with a font and a font size. The string of ASCII characters "ABC123" 1001 is shown within a two-dimensional plane defined by the width abscissa 503 and the height ordinate 504.

FIG. 10A

Referring back to FIG. 9, at step 903, the shape of every ASCII character formatted according to the font and size respectively chosen at steps 901 and 902 and shown in FIG. 10A are vectorised, ie every outline of said shape is divided into a number of vertices such that said outline is divided into a number of segments. As the vectorisation of the shape completes, the vectorised shape is then tesselated into a number of polygons, with said number of polygons depending upon the final rendering resolution.

Figure 10B:
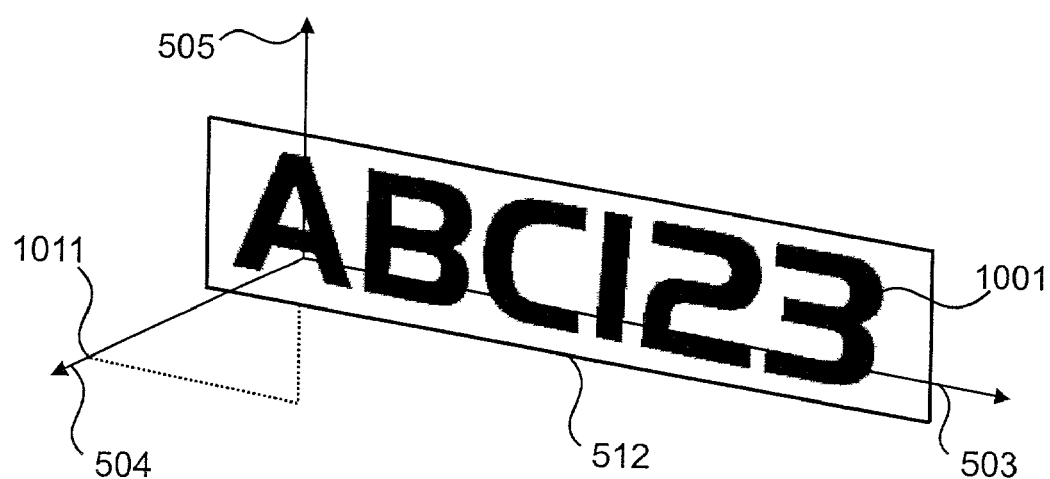
FIG. 10B shows the string of text characters shown in FIG. 10A equipping the two-dimensional 3-D text template as shown in FIG. 8.

The string of ASCII characters 1001 equipped with a font and a font size is shown in FIG. 10B. As the properties of two-dimensional 3-D text template 303 were set according to step 404, the string of ASCII characters "ABC123" 1001 is previewed in the rendered template object 512 defined within the three-dimensional space defined by the width abscissa 503, the height ordinate 505 and the depth abcissa 504. The vectorization and tesselation operations of step 903 are then implemented for the purpose of previewing the string 1001 within the visualisation window 502 and rendering said string upon completing the formatting operations according to steps 404 to 407. Said previewed string 1001 is thus now equipped with a depth value 1011 equal to the depth value of template object 512.

FIG. 10B

Referring back to FIG. 9, a question is asked at step 904 which asks whether an extrusion operation should be performed on the three-dimensional text. If the question of step 904 is answered negatively, control is directed to the next question at step 906. Alternatively, if the question of step 904 is answered positively, then an extrusion operation is required, which increases the thickness of the three-dimensional text. In effect, a copy of the vertices defined within the two-dimensional plane defined by the template object 512 is created and offset along an axis strictly perpendicular to the surface of the template by a distance equal to the extrusion value, and implemented along an axis strictly parallel to the existing template. The respective vertices contained within the first template 512 and the copies thereof are subsequently linked by means of individual lines strictly parallel to the depth abscissa 504 and the surface said parallel joining lines define are subsequently tesselated into polygons. According to the invention, the extrusion depth may be input within windows 506 by means of keyboard 105 or within windows 502 by means of miles 106 or a combination of stylus 102 and tablet 103.

Figure 10C:
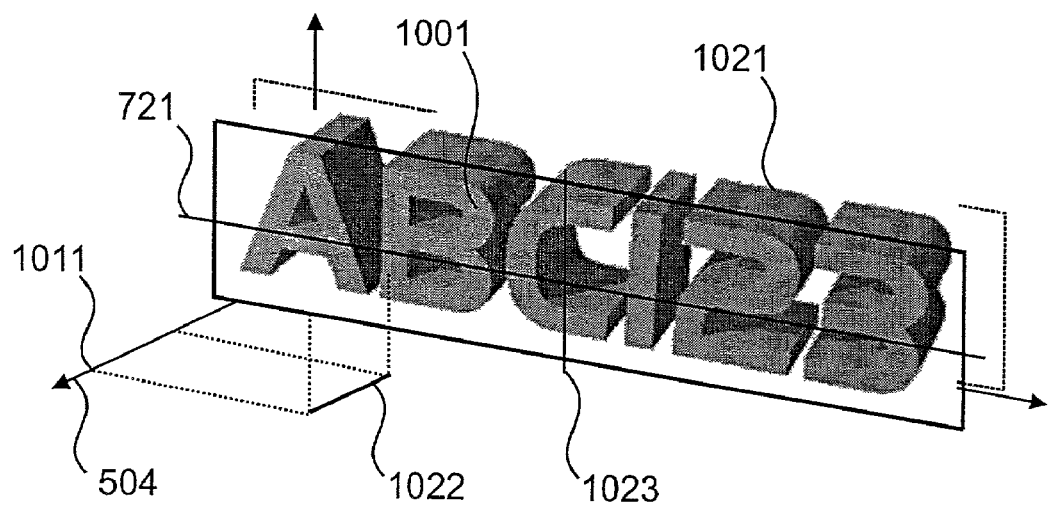
FIG. 10C shows the string of text characters shown in FIG. 10B equipped with extrusion parameters and a texture.

The string of ASCII characters 1001 equipped with a depth is shown in FIG. 10C. The string of ASCII characters "ABC123" 1001 is shown within the template object 512 and extruded by a depth value of 'one' in the example. Consequently, the vertices defining the outlines of the ASCII characters within string 1001 are copied and said copied vertices 1021 are offset by a depth value of 'one' along an axis 1022 strictly parallel to the depth abcissa 504 and strictly perpendicular to the height ordinate 505 and the width abcissa 503. If the template object 512 was rotated either in a two-dimensional plane or within the three dimensional space, the vertices would be offset along an axis strictly perpendicular to either of the median axes 721, 1023 of template object 512 and subsequently aligned so that the vectored outlines they define are strictly parallel to the vectored outlines within said template object 512.

FIG. 10C

Referring back to FIG. 9, a question is asked at step 906 as to whether the 3-D text should be rendered with a specific texture. If the question at step 906 is answered negatively, then control proceeds to the next and last question at step 908. Alternatively, if the question of step 906 is answered positively, then a texture 306 is referenced with which to equip the polygons which define the 3-D text. Said texture is traditionally a bitmap file which is applied to the surface of said polygons so as to provide any three-dimensional object with volume and density.

At step 908, a final question is asked as to whether the textured 3-D text requires an artificial light source. If the question of step 908 is answered positively, artificial lighting properties are inputted which traditionally include the Cartesian co-ordinates of the light source itself within the three-dimensional space, the intensity of the light source expressed as a percentage of the default ambient light within the three-dimensional space and the colour of said artificial light. Artificial lighting of three-dimensional objects within a three-dimensional space will be easily implemented by those skilled in the art, along with further refinements of the operation performed at step 909, such as multiple artificial light sources, adjustable radiosity and luminosity and light diffusion type and others, all of which are also claimed by the present invention.

FIG. 10D

Figure 10D:
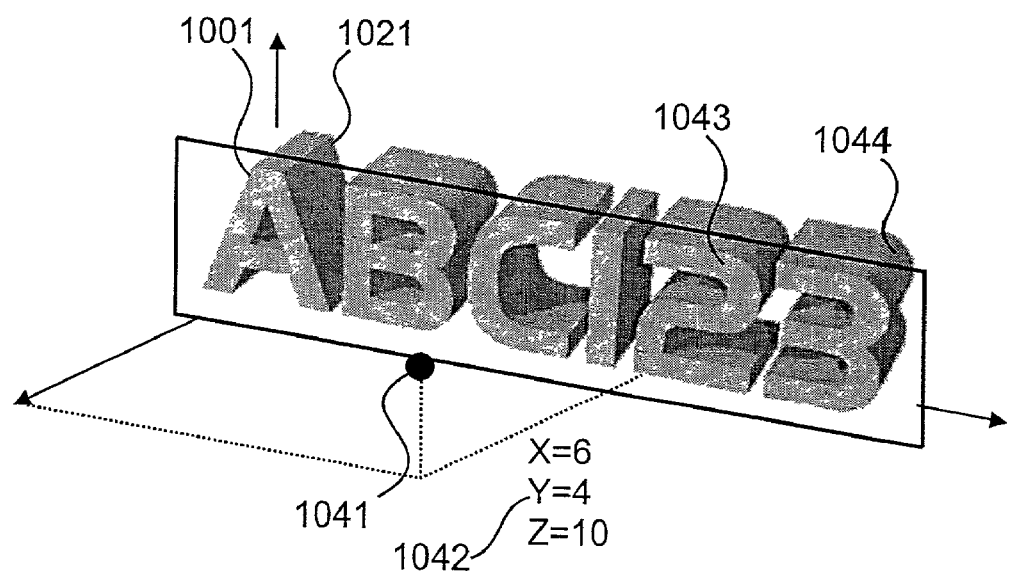
FIG. 10D illustrates the string of text characters as shown in FIG. 10C equipped with lighting properties.
Figure 11:
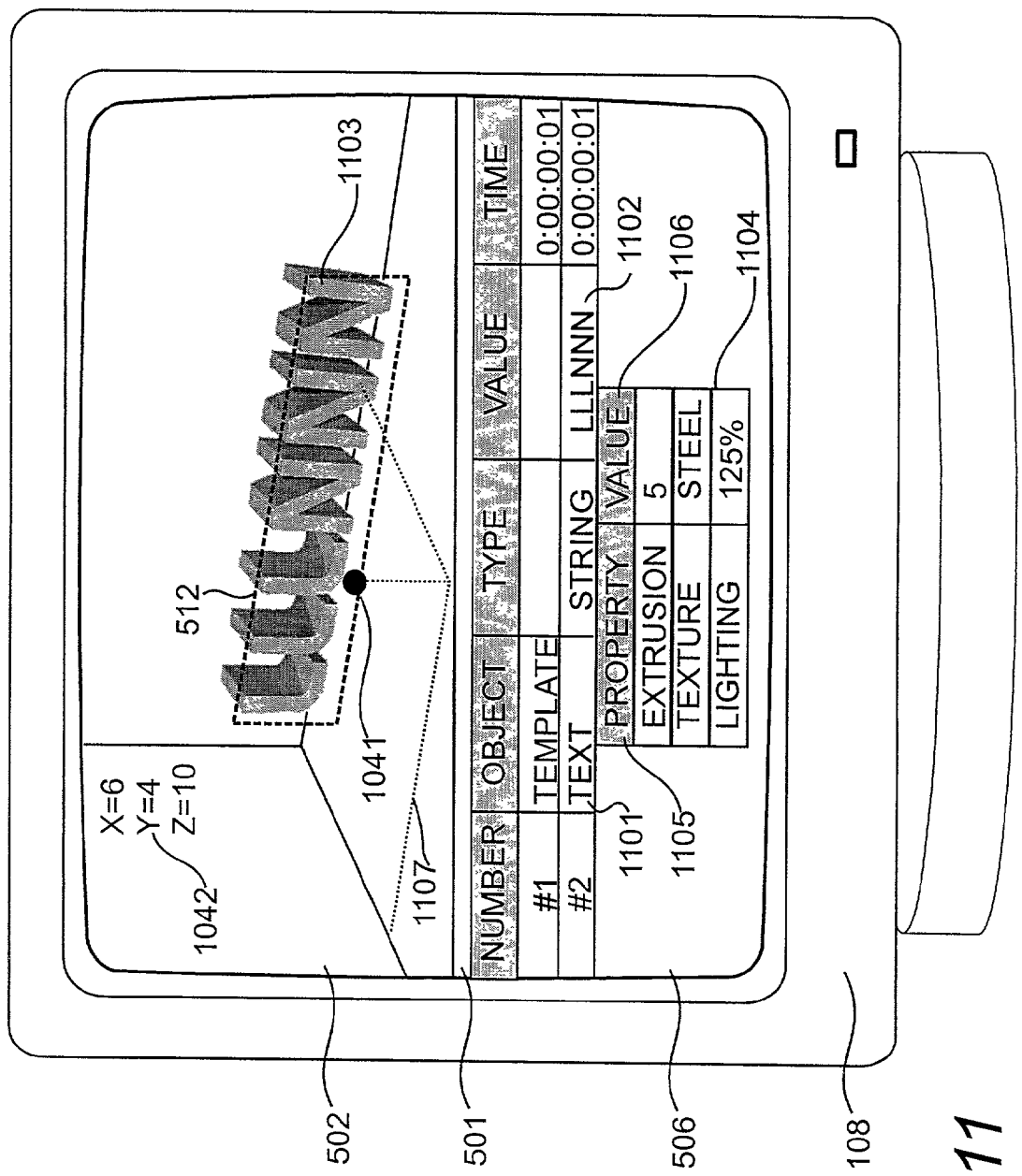
FIG. 11 shows the graphical user interface of FIG. 8 including a two-dimensional 3-D text template and 3-D text as detailed in FIG. 10A to 10D.

The string of ASCII characters 1001 equipped with an extrusion 1021 is shown in FIG. 10D. In the example, the artificial light source 1041 is equipped with Cartesian co-ordinate values 1042 of (6, 4, 10) within the three dimensional space, such that it is more or less centrally positioned in front of template object 512. Said artificial light source is oriented towards the template object 512 and is given an arbitrary brightness of one hundred and twenty-five percent, i.e. twenty-five percent brighter than the ambient light within the three-dimensional space. The 3-D text application 302 subsequently computes the surfaces 1043 which are artificially brightened and the surfaces 1044 which are artificially shadowed. Said surfaces are composed of polygons, the extremities of which are the vertices of vectorized and tessellated ASCII characters 1001 and the extruded vertices 1021 of vectorized and tessellated ASCII characters 1001.

FIG. 11

The results of operations performed according to steps 601 to 609 and subsequently according to steps 901 to 909 are previewed at an intermediate quality, i.e. wherein the polygons of the wireframe of each ASCII character within template object 512 are textured and lighted at an intermediate resolution, within the visualisation window 502. According to the invention, any of the formatting operations performed according to steps 601 to 609 and subsequently 901 to 909 may be previewed within window 502 at a minimum wireframe rendering quality or at a maximum resolution rendering quality or any rendering level comprised within said minimum and maximum levels, depending upon the configuration of the system 101.

The font selection and font size selection operations according to steps 901 to 902 can be performed either by means of clicking with mouse 106 or a combination of stylus 102 with tablet 103 onto template object 512 within window 502 and accomplishing said operations by means of motions applied to said input means or, alternatively, clicking with mouse 106 or a combination of stylus 102 with tablet 103 onto the 'text' entry 1101 in object referencing column 508 within window 506. In order to visualise the forthcoming formatting operations according to steps 904 through to 909, a temporary string 'LLLNNN' 1102 is inputted by means of keyboard 105 into the object value column 510 relating to the 'text' entry 1101 in object referencing column 508. Upon inputting the string, said string 1102 is rendered within the template object 512 within window 502 as vectorized and tessellated 3-D text 1103.

Upon clicking on said 'text' entry, a third window 1104 displays the properties of the 3-D text 1103 rendered within the template object 512, which are stored in the main memory 204 as part of the 3-D text template 303 being edited, the properties of which were defined at steps 601 to 609. Said properties include a text properties referencing column 1105 and a text property value column 1106. Said properties refer to extrusion, texture and lighting operations according to steps 904 through to 909. According to the invention, each entry in said property value column 1105 may be selected for editing by means of stylus 102 and tablet 103, keyboard 105, or mouse 106 or a combination thereof.

In the example, the 3-D text 1103 within the 3-D text template 303 is defined and its properties are amended as was previously explained in FIGS. 10C and 10D. Accordingly, the value of the extrusion property is one. The value of the texture property is 'steel', indicating that all the polygons of 3-D text 1103 are to be overlayed with a bitmap image configured to represent a steel aspect.

Figure 12:
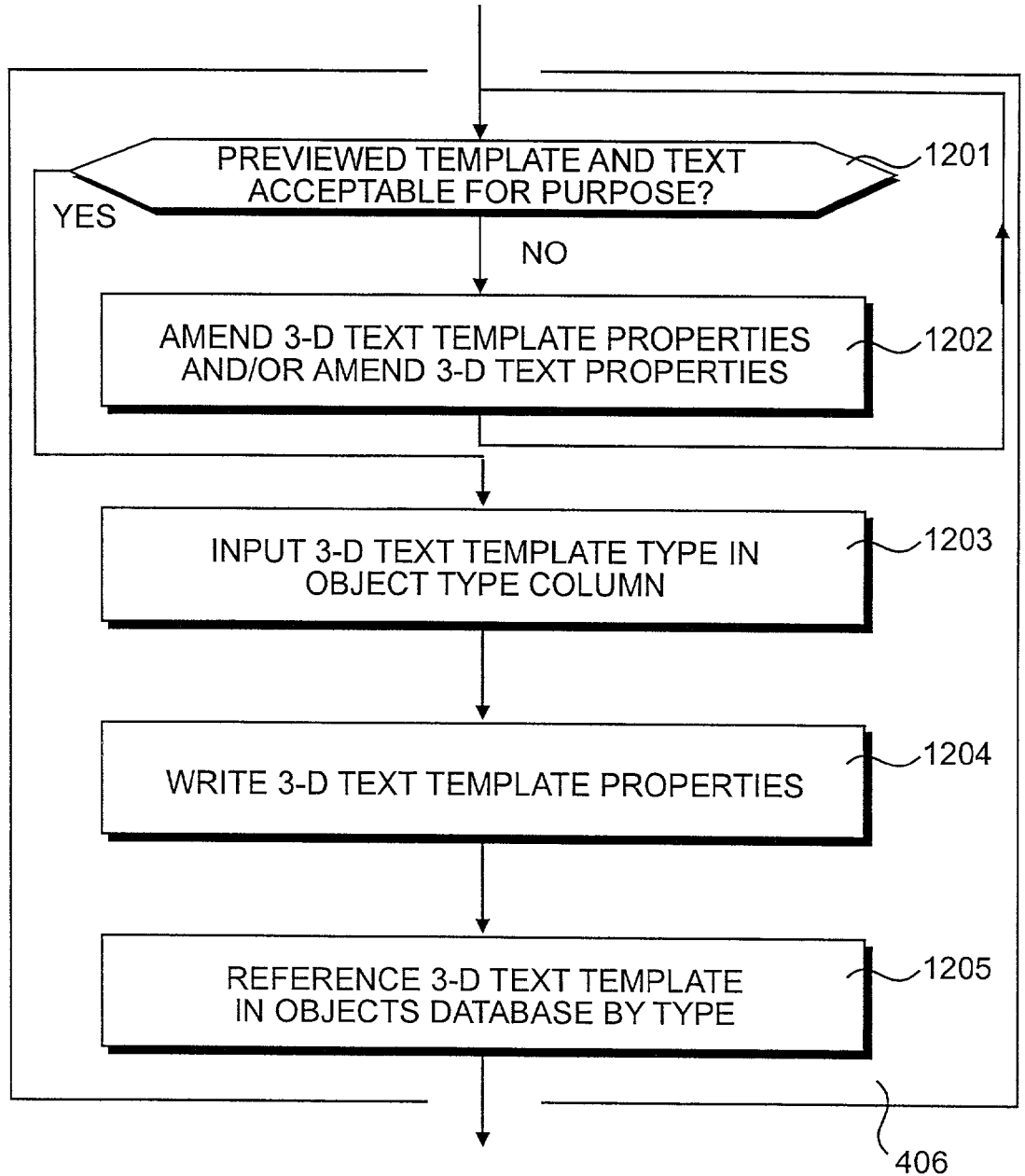
FIG. 12 details the actions performed by the 3-D text application shown in FIGS. 3 and 4 in order to write the properties of the 3-D text template shown in FIG. 11.

The value of the light source's brightness selected according to step 909 is 125%, as was previously explained. Dotted lines 1107 link the artificial light source 1041 to the width abscissa 503 and the depth abscissa 504 within the three-dimensional space, in addition to the overlayed cartesian co-ordinates 1042. Upon completing the definition of the artificial lighting, the complete set of 3-D text formatting properties may now be appended to the properties of the 3-D text template 303 according to step 406, which is further detailed in FIG. 12.

FIG. 12

Depending upon the level of proficiency of the user of system 101 in defining a 3-D text template 303 and formatting 3-D text therein, many successive attempts at finalising the respective properties thereof may be required. Therefore, a question is asked at step 1201 as to whether the 3-D text template 303 previewed as template object 512 equipped with formatted 3-D text 1103 within window 502 is acceptable for its intended purpose in its current configuration. If the question at step 1201 is answered negatively, then at step 1202 the 3-D text template properties are amended according to operations performed at steps 603 through to 609 or, alternatively, the 3-D text formatting properties are amended according to operations performed at steps 901 through to 909. According to the invention, the respective formatting properties of the 3-D text template and the 3-D text can be amended independently from one another, by means of alternatively selecting the "template" entry 802 in the object referencing column 508 so as to amend the template properties and selecting the "text" entry 1101 in said object referencing column 508 in order to amend the text properties. Upon completing the amendments at step 1202, control is returned to the question of step 1201, wherein said amendments are again previewed and assessed until such time as the question of step 1201 is answered positively and control is subsequently directed to step 1203.

At said step 1203, the 3-D text template 303 is named as a template type 805 in object type column 509 by system 101's user in order to reference said template as a specifically defined template, as opposed to a default template, which may therefore be retrieved at step 403 at a later session of 3-D text application 302.

Said template type 805 is an arbitrary string of alpha numerical characters and, in the example shown, the user intends to use said template to display three capital letters and three numbers, thus the template is give the type "LLLNNN". At step 1204, the 3-D text template 303 properties, including the 3-D text formatting properties, are written in an internal medium, such as hard disk drive 205, or an external medium such as floppy disk 112, or a combination thereof.

At step 1205, the specific template is referenced in object database 304 by means of the type 805 which uniquely identifies said specific template 303 amongst any other default or specific template contained therein.

Figure 13:
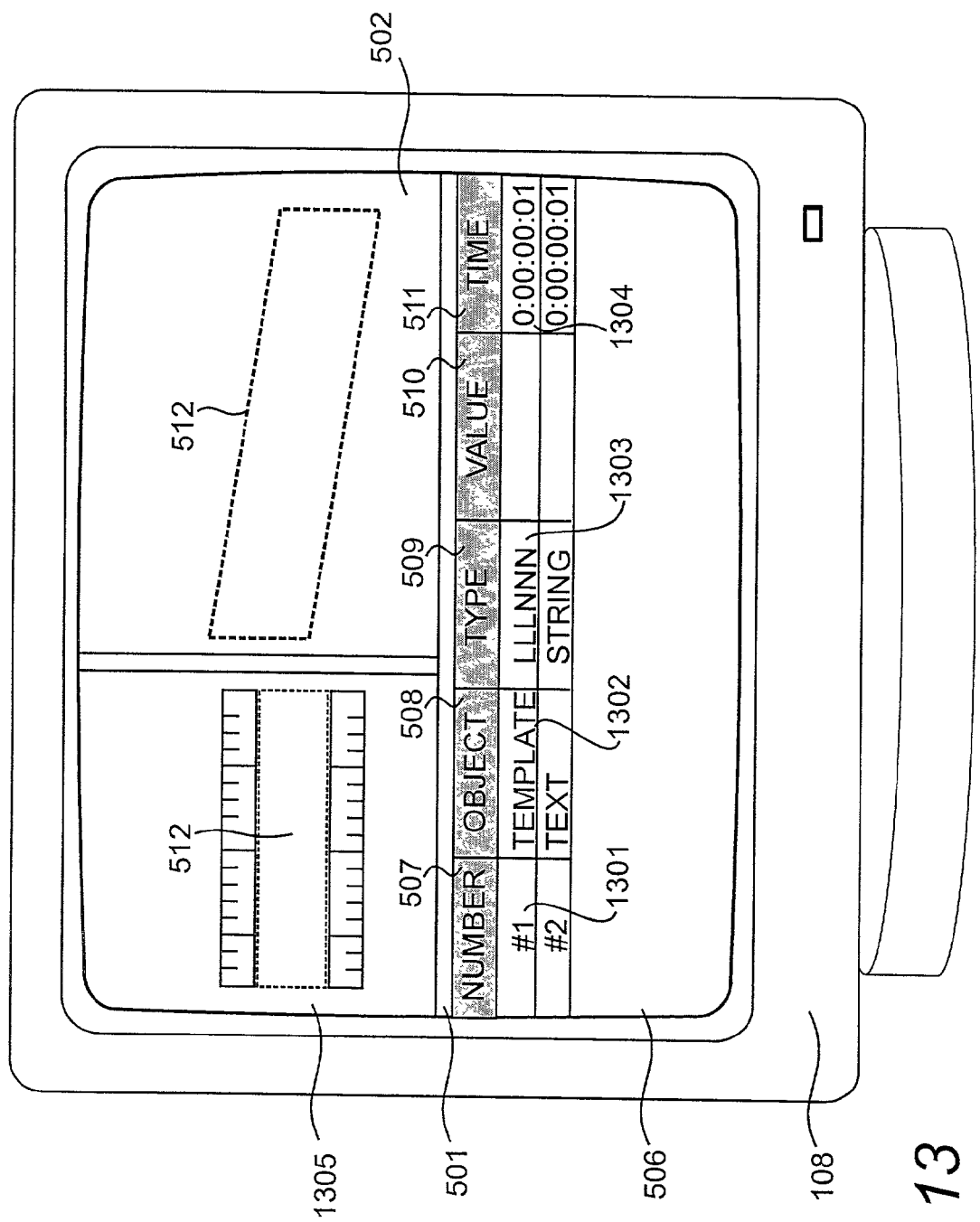
FIG. 13 shows the GUI of the 3-D text application shown in FIG. 3 when the 3-D text template properties and the 3-D text properties within said template are retrieved according to the invention.

Referring back to FIG. 4, if the question asked at step 403 in order to determine if an existing template, ie a specific template, should be retrieved is answered positively then 3-D text application 302 prompts the user of system 101 for the template reference and, upon retrieving the properties of said specific template, 3-D text application 302 subsequently displays said specific template within GUI 501 according to said properties. A GUI 501 wherein a specific template according to the invention is displayed is shown in FIG. 13.

FIG. 13

As previously detailed, the GUI 501 divides the display area of output monitor 104 into multiple windows. The visualisation window 502 shows the wireframe outline 512 of the 3-D text template 303 defined within the three-dimensional space according to the properties retrieved at step 403 and/or the properties written at step 406.

The second window 506 displays the contents of the page of the objects database 304 relating to the specific template 303. Said specific template is an object amongst a plurality of potential objects within the three dimensional space and is thus referenced as the first 1301 of said objects within the three dimensional space in column 507, as a template 1302 in column 508, and as the specific template to be equipped with three letters and three numbers 'LLLNNN' 1303 in column 509.

No value is required in column 510, as template 303 is an object which does not contain an overall value-driven property. However, the timecode 1304 '0:00:00:01' expressed as minutes, seconds, tenths of seconds and individual frames in column 511 indicates that template 303 is to be rendered in the first possible frame after video-synchronisation with the broadcast shown in real-time in high-quality monitor 108.

In a preferred embodiment of the present invention, a third window 1305, which is another visualisation window, is displayed within GUI 501. Said window shows the template object 512 rendered in two dimensions only, for the purpose of editing the ASCII characters which will equip template 303 and verify the correct text content and formatting of the template before it is rendered at step 408. It can be observed that the entry in the value column 510 corresponding to the text object is empty and so windows 502 and 1305 only display the wireframe outline 512 of 3-D text template.

Figure 14:
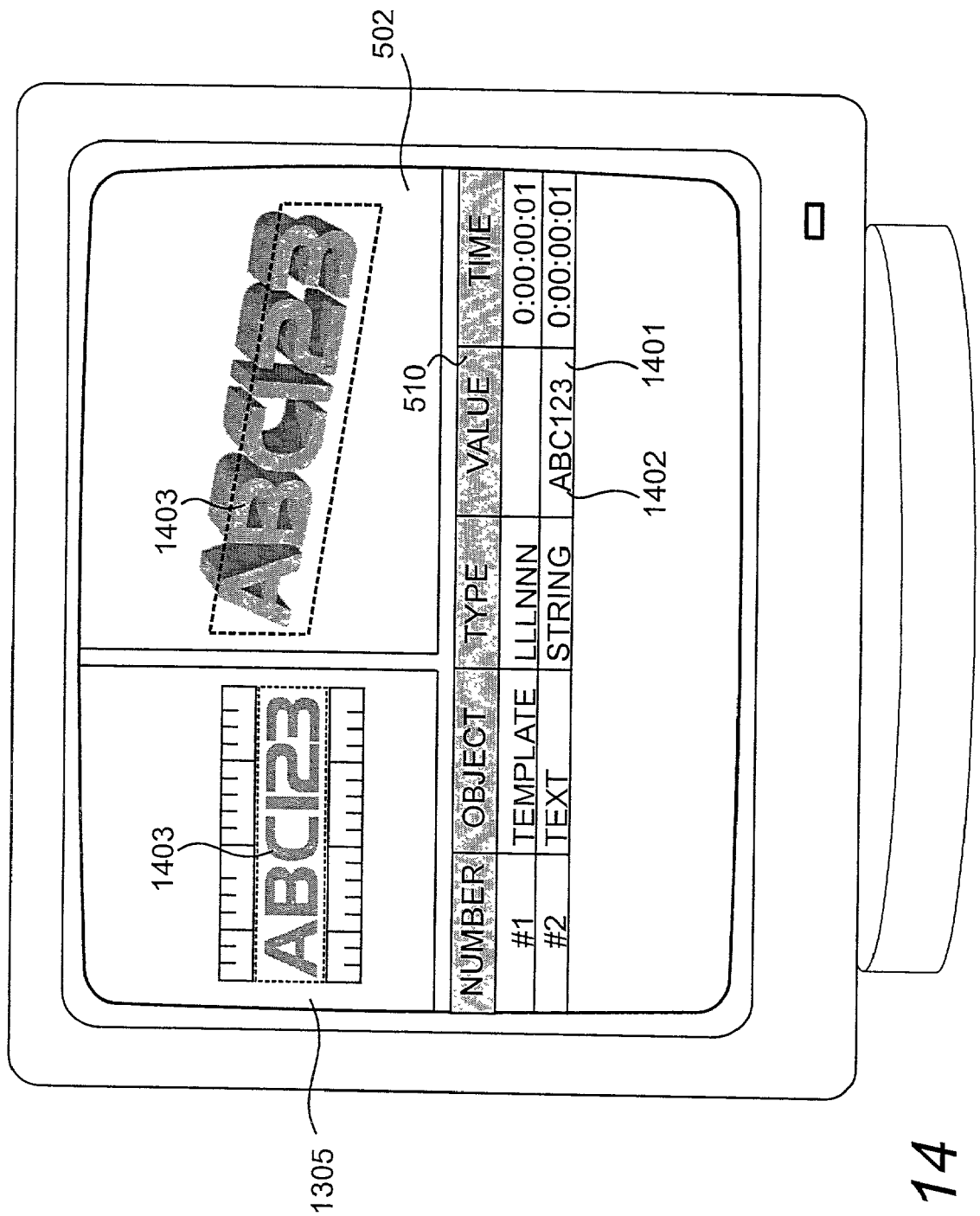
FIG. 14 shows the 3-D text rendered within the application GUI shown in FIG. 13 according to the invention.

The 3-D text template 303 according to the invention is therefore retrieved and rendered, and includes text formatting properties such that any string of ASCII characters inputted in the value column 510 corresponding to the text object is rendered within said template according to said formatting properties, thus is rendered in three dimensions. Said 3-D text rendering is further detailed in FIG. 14.

FIG. 14

It was previously explained that each entry in columns 507 to 511 may be selected for editing by means of stylus 102 and tablet 103, keyboard 105, or mouse 106 or a combination thereof.

Therefore, according to the present invention, upon selecting the entry 1401 in the value column 510 corresponding to the text object and inputting a string of ASCII characters "ABC123" 1402 by means of keyboard 105, said string 1402 is immediately rendered as three-dimensional text 1403 within the template object 512 within windows 502 and 1305 according to the 3-D text properties contained within 3-D text template 303.

Figure 15:
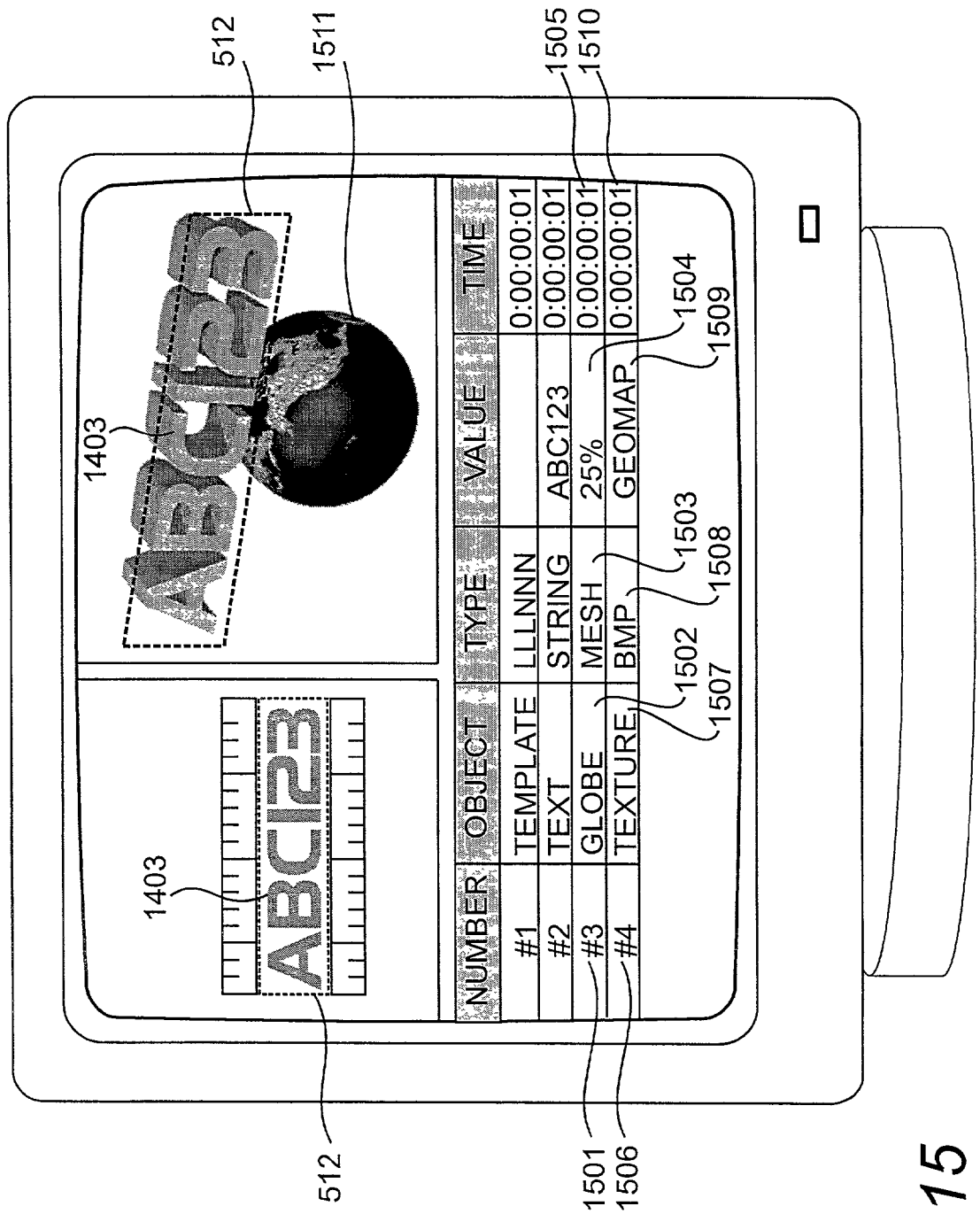
FIG. 15 shows the 3-D text shown in FIG. 14 rendered with other three-dimensional objects according to the invention.

It was previously mentioned that additional three-dimensional objects may be implemented within the three-dimensional space within which template object 512 is located. Said implementation of additional objects is shown in FIG. 15.

FIG. 15

The 3-D text template is defined within the three-dimensional space and is a two-dimensional object within said space. Said space may include further two- or three-dimensional objects in addition to said template and, in the example, the topic of the broadcast to be equipped with the titling composited according to the invention is global. An 'earth' object is thus implemented by system 101's user, which consists of a globe made of polygons, known to those skilled in the art as a mesh, overlayed with a texture depicting a geographical map of the world.

Said implementation requires the initial referencing of said 'earth' object in the second window 506. The 'earth' object is equipped with a unique reference (1501) within referencing column 507, to differentiate it from the 3-D template and the ASCII string within database 304. The 'earth' object is subsequently identified within referencing column 508 as globe 1502. The standard mesh 305 stored in the main memory 204 which is used to build the 'earth' object is then pointed at by means of the mesh designation 1503, i.e. a three-dimensional volume bounded by surfaces tessellated into polygons within type column 509. The mesh is scaled to 25% of its default size in order to fit the design requirements of the composited template, and thus its value is inputted as 25% (1504) within value column 510. Finally, the timecode 1505 '0:00:00:01' expressed as minutes, seconds, tenths of seconds and individual frames in column 511 indicates that the 'earth' object is to be rendered in the first possible frame after video-synchronisation with the broadcast shown in real-time in high-quality monitor 108, similarly to the 3-D template.

As the 'earth' object is now defined within the three-dimensional space, its implementation also requires the referencing of the texture 306 to be applied onto the corresponding mesh 1503 in the second window 506. The 'earth' texture is equipped with a unique reference (1506) within referencing column 507, to differentiate it from the 3-D template, the ASCII string and the earth object's mesh within database 304. The 'earth' texture is subsequently identified within referencing column 508 as a texture 1507. The 'earth' object is then typified as a bitmapped texture 1508, i.e. a two-dimensional image constructed from individual pixels, within type column 509. In order to differentiate the texture to be applied to the 'earth' object from any other texture 306 stored in main memory 204, the bitmap filename is inputted as its value (1509) within value column 510. Finally, the timecode 1510 '0:00:00:01' expressed as minutes, seconds, tenths of seconds and individual frames in column 511 indicates that the 'earth' texture is to be applied to the 'earth' object for rendering in the first possible frame after video-synchronisation with the broadcast shown in real-time in high-quality monitor 108, similarly to the 3-D template.

As properties of the new 'earth' object are inputted and subsequently written within objects database 304, said 'earth' object is rendered within window 502 according to the level of rendering quality indicated for preview as a three-dimensional model 1511. In the example, said preview rendering quality is indicated as good, and a fully-rendered 'earth' object 1511 is rendered within window 502 in conjunction with the template object 512 and 3-D text 1403.

Figure 16:
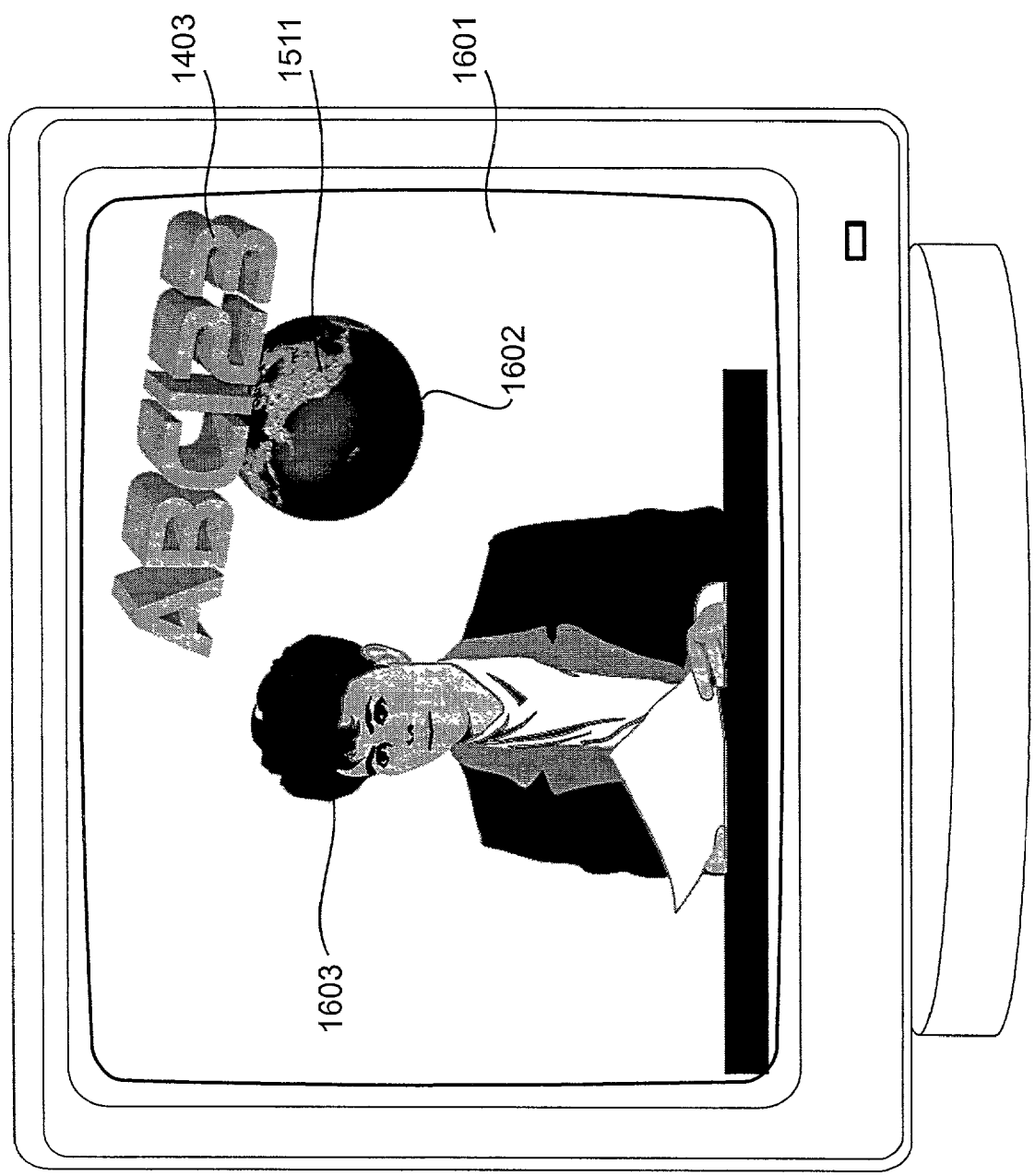
FIG. 16 shows a frame of the live broadcast shown in FIG. 1 composited with 3-D text according to the invention.

As previously explained, window 1305 only shows the template 303 rendered in two dimensions for the purpose of editing the ASCII characters which equip template 303 and verify the correct text content and formatting of the template before it is fully rendered at step 408. The 'earth' object 1511 is thus not rendered within said window 1305. In the example, the 3-D template 303 is now ready for titling the broadcast shown in monitor 108. A frame of the broadcast which is titled in real-time with a 3-D template according to the invention is shown in FIG. 16.

FIG. 16

System 101 is configured to equip a live video broadcast with computer-generated graphical titles. Consequently, upon obtaining a satisfying preview in window 502 on VDU 104, system 101 user instructs 3-D text application 302 to equip the next frame 1601 of the video footage broadcast in real-time with the composited title 1602 comprising 3-D text template 303 equipped with the 'ABC123' string of ASCII characters 1402 inputted at step 407 and rendered at step 408 according to the 3-D text template properties retrieved at step 403 or written at step 406, and other three-dimensional objects referenced within the same page of the objects database 304 as said template 303, such as the 'earth' object 1511.

In the example, a presenter 1603 is reading news in front of a blue screen according to the prior art, such that a static or moving background image may be overlayed, along with the title 1602 according to the invention. The next available frame displayed by broadcast-quality monitor 108 therefore shows a presenter 1603 along with said title 1602, as said 3-D template according to the invention is rendered in real-time.

Figure 17:
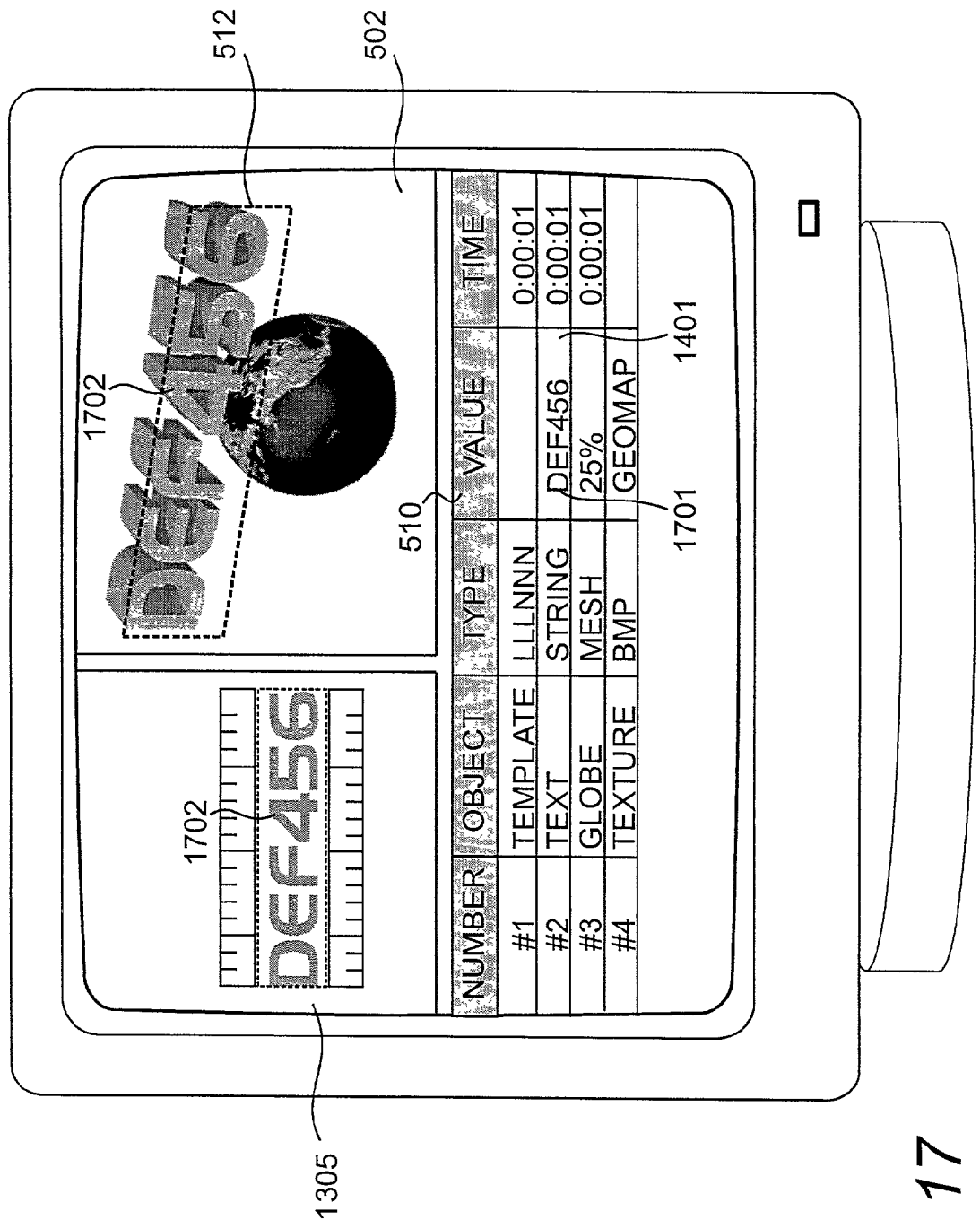
FIG. 17 shows the GUI as shown FIG. 15 when the string of text characters is changed.

In the example, a new information develops during the live broadcast and the text value 1402 within the 3-D template 303 in title 1602 requires editing and rendering in real-time as said information develops. The editing of the text contents of the 3-D template within title 1602 is shown in FIG. 17.

FIG. 17

As the new information develops and the text contents within the 3-D template require editing in real-time to reflect the changes in the information, according to the present invention, upon selecting the entry 1401 in the value column 510 corresponding to the text object and inputting a new string of ASCII characters "DEF456" 1701 to replace the previous string of ASCII characters "ABC123" 1402 by means of keyboard 105, said string 1701 is immediately rendered as three-dimensional text 1702 within the template object 512 within windows 502 and 1305 according to the 3-D text properties contained within 3-D text template 303. Accordingly, the title 1602 is rendered with the new three-dimensional text 1702 as said rendering occurs in real-time according to the invention.

Figure 18:
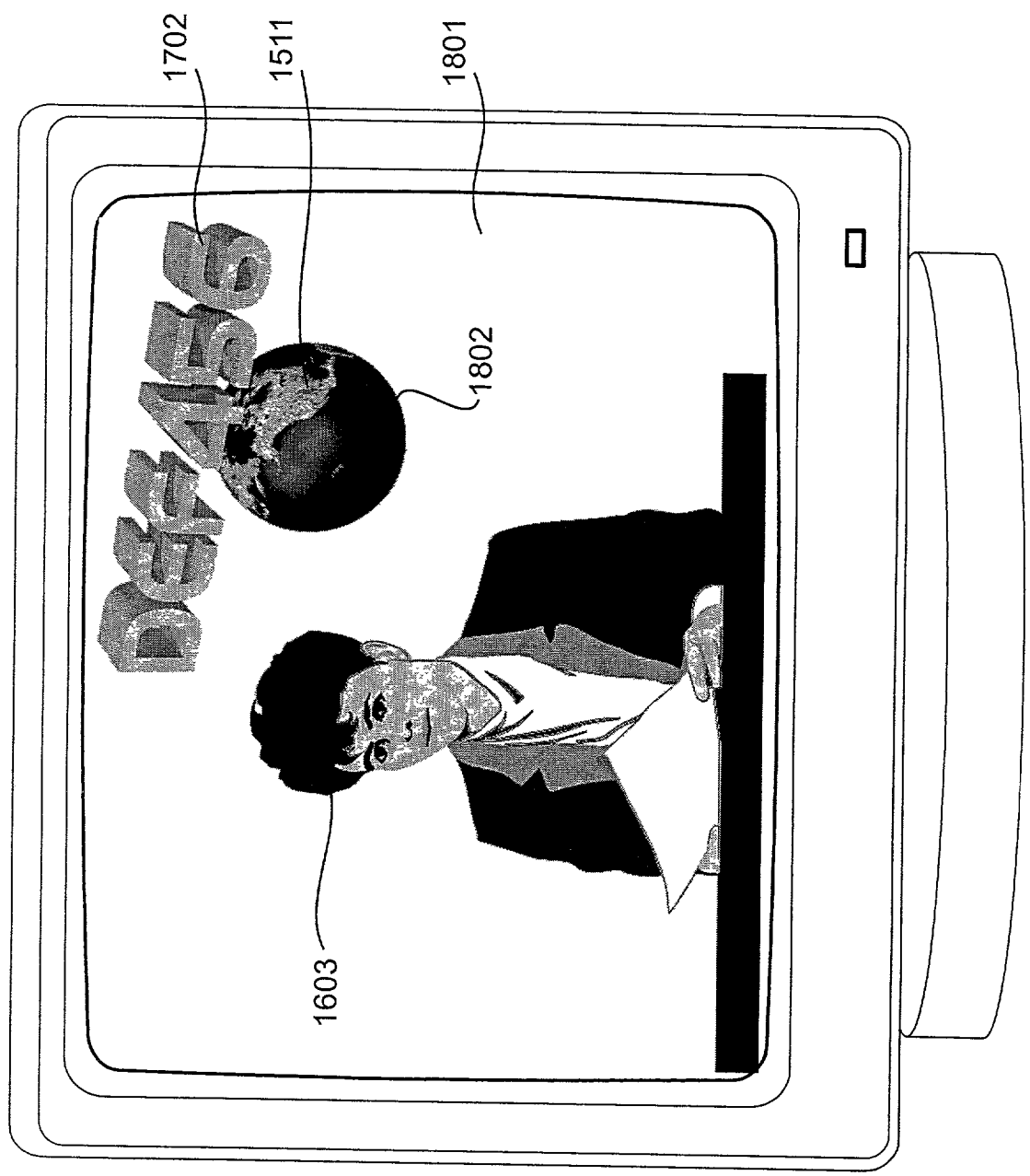
FIG. 18 shows the frame as shown in FIG. 16 when the string of text characters changed in FIG. 17 is rendered.

A frame titled in real-time with a 3-D template according to the invention is shown in FIG. 18, which is subsequent to the previous frame of the broadcast shown in FIG. 16, wherein the text which equipped the 3-D template rendered in said previous frame has been edited in real-time.

FIG. 18

3-D text application 302 equips the next frame 1801 of the video footage broadcast in real-time with the composited title 1802 comprising 3-D text template 303 equipped with the 'DEF456' string of ASCII characters 1701 inputted at step 407 and rendered at step 408 according to the 3-D text template properties retrieved at step 403 or written at step 406, and other three-dimensional objects referenced within the same page of the objects database 304 as said template 303, such as the 'earth' object 1511.

The next available frame displayed on broadcast-quality monitor 108 therefore shows the same presenter 1603 along with the composited title 1802, as said 3-D template according to the invention is rendered in real-time.

Alternatively, 3-D text application 302 equips the next frame 1801 of the video footage broadcast in real-time with the composited title 1802 comprising 3-D text template 303 equipped with any string of ASCII characters inputted at step 407 and rendered at step 408 according to the 3-D text template properties retrieved at step 403 or written at step 406, and other three-dimensional objects referenced within the same page of the objects database 304 as said template 303, such as the 'earth' object 1511.

In a preferred embodiment of the present invention, the 3-D text application 302 can be linked to any real-time information database known to those skilled in the art, such that said link configures the selection and edition of the entry 1401 in the value column 510 corresponding to the text object to automatically update said entry 1401 upon the contents of said information database being updated in real-time. The three-dimensional text generated in real-time from said entry 1401 is therefore updated accordingly and the corresponding title 1802 dynamically reflects updates of said real-time information database.

A method, apparatus, and computer readable medium provide the ability to generate three-dimensional text within images composited in real time, comprising means for generating said three-dimensional text from one or a plurally of text formatting templates, including processing means and storage means. Storage means stores said text formatting templates and instructions for said processing means. The instructions configure said processing means to perform multiple steps including: defining one of said text formatting templates as a two-dimensional template equipped with cartesian co-ordinates within a three-dimensional space, equipping said defined text formatting template with three-dimensional preferences with which to format text to be included in said template, equipping said defined text formatting template with said text, and rendering said two-dimensional template including said text formatted according to said three-dimensional preferences within said three-dimensional space.

One or a plurality of the text formatting templates may be a two-dimensional plane delimited by two sets of two parallel segments of an identical length, the respective extremities of the segments of the first set intersecting the respective extremities of the segments of the second set at a right angle. Additionally, the defining step (of the template as a 2D template with cartesian coordinates) may comprise either a two-dimensional rotation, or a thee-dimensional rotation, or a scaling operation or any combination thereof. Further, the two-dimensional rotation, three-dimensional rotation and scaling operation are implemented either by motion input or alphanumerical input or any combination thereof.

The three-dimensional preferences with which to format text to be included in said template may comprise either an extrusion depth, or one or a plurality of textures with which to equip said text, or one or a plurality of light sources with which to light said text, or any combination thereof. Further, the extrusion depth, textures, or light sources may be implemented either by motion input or alphanumerical input or any combination thereof.

The text may be one or a plurality of ASCII characters equipped with a that and font size, every outline of which is subsequently divided into a number of vertices, such that said every outline is divided into a number of segments that are tessellated into a number of polygons, with said number of polygons depending upon the final rendering resolution. The equipping of the defined text formatting template may be alphanumerical data inputted either by means of physical input means or by means of a data source linked to said text formatting template. Further, the equipping step may be performed in real time.

The rendering step of the two-dimensional template (including said text formatted according to said three-dimensional preferences within said three-dimensional space) may be performed in real time.

What is claimed is:

1. Apparatus for generating a live video broadcast in which information to be broadcast develops during said broadcast and said information is reflected in three-dimensional text included with said broadcast, comprising:
   (a) video signal generation means for generating a live video signal;
   (b) a text input device and text input receiving means for receiving input text from said text input device;
   (c) an object database arranged to store a template of three dimensional preferences for input text in one or more objects;
   (d) a display means configured to display contents of the object database for the template in a first window, wherein the first window comprises:
      (i) an object number referencing column;
      (ii) an object referencing column;
      (iii) an object type column;
      (iv) an object value column; and
      (v) a timecode display column;
   (e) text generating means for generating three dimensional text by formatting said input text in accordance with the three dimensional preferences of said template; and
   (f) combining means arranged to combine said three dimensional text with said live video signal to produce a broadcast signal.

2. Apparatus according to claim 1, wherein said text input device is a manually operable keyboard.

3. Apparatus according to claim 1, wherein said text input device is real-time database.

4. Apparatus according to claim 1, wherein said three-dimensional preferences are defined by a movement or by a alpha-numeric input.

5. Apparatus according to claim 1, wherein said three-dimensional preferences specify a behaviour that takes place as text is added.

6. Apparatus according to claim 1, wherein said three-dimensional preferences specify a rotation in two-dimensions or in three-dimensions.

7. Apparatus according to claim 1, wherein said three-dimensional preferences define a scaling factor, an extrusion, a texture, or a light source, or any combination of the aforesaid preferences.

8. Apparatus according to claim 1, wherein said object database is arranged to store a plurality of available templates wherein one of said templates is selected for a particular application.

9. A method for generating a live video broadcast wherein information to be broadcast in three-dimensional text develops during said broadcast, the method comprising:
   (a) generating a live video signal;
   (b) receiving input text from an input device;
   (c) reading a template of three-dimensional preferences, stored in one or more objects, for said input text from an object database;
   (d) displaying the three-dimensional preferences of the template in a first window, wherein the first window comprises:
      (i) an object number referencing column;
      (ii) an object referencing column;
      (iii) an object type column;
      (iv) an object value column; and
      (v) a timecode display column;
   (e) generating three-dimensional text by formatting said input text in accordance with said three-dimensional preferences of said template; and
   (f) combing said tree-dimensional text with said live video to produce a broadcast signal.

10. A method according to claim 9, wherein said text input device is a manually operable keyboard.

11. A method according to claim 9, wherein said text input device is a real-time database.

12. A method according to claim 9, wherein said three-dimensional preferences are defined by a movement or by a alpha-numeric input.

13. A method according to claim 9, wherein said three-dimensional preferences specify a behavior that takes place as text is added.

14. A method according to claim 9, wherein said three-dimensional preferences specify a rotation in two-dimensions or in three-dimensions.

15. A method according to claim 9, wherein said three-dimensional preferences define a scaling factor, an extrusion, a texture, or a light source, or any combination of the aforesaid preferences.

16. A method according to claim 9, wherein said object database is arranged to store a plurality of available templates wherein one of said templates is selected for a particular application.

17. A method according to claim 9, wherein said preferences define the position of said three-dimensional text.

18. Apparatus for generating a live video broadcast in which information to be broadcast develops during said broadcast and said information is reflected in three-dimensional text included with said broadcast, comprising:
   (a) video signal generation means for generating a live video signal;
   (b) a text input device and text input receiving means for receiving input text from said text input device;
   (c) an object database arranged to store a template of three dimensional preferences for input text in one or more objects;
   (d) a display means configured to:
      (i) display contents of the object database for the template in a first window;
      (ii) display a second window when an object displayed in the first window is selected, said second window comprising:
         (1) a template properties referencing column comprising one or more properties of the object; and
         (2) a template property value column comprising one or more values for each property displayed in the template properties referencing column;
   (e) text generating means for generating three dimensional text by formatting said input text in accordance with the three dimensional preferences of said template; and
   (f) combining means arranged to combine said three dimensional text with said live video signal to produce a broadcast signal.

19. The apparatus according to claim 1 wherein the first window provides a graphical user interface for a user to edit the contents of the object database displayed in the first window in text based columns.

20. A method for generating a live video broadcast wherein information to be broadcast in three-dimensional text develops during said broadcast, the method comprising:
(a) generating a live video signal;
(b) receiving input text from an input device;
(c) reading a template of three-dimensional preferences, stored in one or more objects, for said input text from an object database;
(d) displaying the three-dimensional preferences of the template in a first window,
(e) displaying a second window when an object, for a three-dimensional preference, displayed in the first window is selected, said second window comprising:
(i) a template properties referencing column comprising one or more properties of the object; and
(ii) a template property value column comprising one or more values for each property displayed in the template properties referencing column;
(e) generating three-dimensional text by formatting said input text in accordance with said three-dimensional preferences of said template; and
(f) combing said three-dimensional text with said live video to produce a broadcast signal.

21. The apparatus according to claim 9 wherein the first window provides a graphical user interface for a user to edit the contents of the object database displayed in the first window in text-based columns.

* * * * *